United States Patent
Kenawy

(10) Patent No.: US 12,537,894 B2
(45) Date of Patent: Jan. 27, 2026

(54) SOCIAL MEDIA APPLICATION PLATFORM (APP) FOR EXCHANGING VOICE MESSAGES AND METHODS OF USING SAME

(71) Applicant: Aly Kenawy, Easton, PA (US)

(72) Inventor: Aly Kenawy, Easton, PA (US)

( * ) Notice: Subject to any disclaimer, the term of this patent is extended or adjusted under 35 U.S.C. 154(b) by 243 days.

(21) Appl. No.: 18/207,341

(22) Filed: Jun. 8, 2023

(65) Prior Publication Data
US 2024/0414259 A1    Dec. 12, 2024

(51) Int. Cl.
| | |
|---|---|
| H04M 1/72439 | (2021.01) |
| G06F 3/16 | (2006.01) |
| H04L 51/046 | (2022.01) |
| H04L 51/52 | (2022.01) |
| H04M 1/72433 | (2021.01) |
| H04W 8/18 | (2009.01) |

(52) U.S. Cl.
CPC ........ *H04M 1/72439* (2021.01); *G06F 3/167* (2013.01); *H04L 51/046* (2013.01); *H04L 51/52* (2022.05); *H04M 1/72433* (2021.01); *H04W 8/186* (2013.01); *H04M 2201/40* (2013.01)

(58) Field of Classification Search
CPC .... G06F 3/167; G06F 16/9535; G06F 16/437; G06F 3/16
See application file for complete search history.

(56) References Cited

U.S. PATENT DOCUMENTS

| | | | |
|---|---|---|---|
| 9,385,983 B1 | 7/2016 | Sehn | |
| 11,445,148 B1* | 9/2022 | Øhrn | G06V 10/772 |
| 11,615,790 B1 | 3/2023 | Shivalingaiah et al. | |
| 2005/0160167 A1* | 7/2005 | Cheng | H04L 67/306 |
| | | | 709/224 |
| 2015/0074206 A1* | 3/2015 | Baldwin | H04L 51/52 |
| | | | 709/206 |
| 2019/0220335 A1* | 7/2019 | Pather | A63F 13/86 |
| 2023/0070881 A1 | 3/2023 | Taylor | |

OTHER PUBLICATIONS

Hartzler et al., "Design and Usability of Interactive User Profiles for Online Health Communities," ACM Trans. Comput.-Hum. Interact. 23, 3, Article 15 (Jul. 2016), 33 pages. (Year: 2016).*
Corvite et al., "Social Media's Role During Identity Changes Related to Major Life Events," Proc. ACM Hum.-Comput. Interact. 6, CSCW2, Article 328 (Nov. 2022), 22 pages. (Year: 2022).*

* cited by examiner

*Primary Examiner* — Stephen S Hong
(74) *Attorney, Agent, or Firm* — James R. McDaniel

(57) ABSTRACT

Systems, methods, and other embodiments for supporting a social media application platform that utilizes the exchange of voice messages are disclosed. In one embodiment, the system is generally related to social media application platforms (or social media apps). The social media application platform strictly focuses on the unedited and genuine human voice. Users are only permitted to upload one photo for their profile on the social media application platform. Furthermore, the social media application platform focuses on the way the user speaks and the energy the user can carry in an interrupted conversation.

17 Claims, 24 Drawing Sheets

SOCIAL MEDIA APPLICATION PLATFORM (APP) FOR EXCHANGING VOICE MESSAGES AND METHODS OF USING SAME

FIELD OF THE INVENTION

The present invention is generally related to social media application platforms (or social media apps). The social media application platform is a novel social media application platform that utilizes the exchange of voice messages. The application platform strictly focuses on the unedited and genuine human voice. Users are only permitted to upload one photo for their profile on the application platform. Furthermore, the application platform focuses on the way the user speaks and the energy the user can carry in an interrupted conversation.

BACKGROUND OF THE INVENTION

Prior to the present invention, as set forth in general terms above and more specifically below, it is known, that the current, available social media application platforms (apps) focus on the sharing of text messages, pictures, selfies, videos and the like. However, it is further known that misunderstandings between the parties communicating through the known social media application platforms can result due to the misinterpretations of the text messages, pictures, selfies, and/or videos. Furthermore, misunderstandings may arise between the parties communicating due to misspellings or a failed attempt by the autocorrect feature of the current social media application platforms to fix a word in the text message. Therefore, it would be desirable to provide a social media application platform that is based on the authenticity of one's unedited voice and revolves strictly around the exchange of voice messages so that the app users can focus on the way you speak and the energy you can carry in an interrupted conversation.

It is a purpose of this invention to fulfill these and other needs in the social media application platform (app) art in a manner more apparent to the skilled artisan once given the following disclosure.

The preferred social media application platform, according to various embodiments of the present invention, offers the following advantages: ease of use; the ability to communicate with another member of the social media application platform based solely on the exchange of voice messages; the ability to sync with (add contacts) other people with whom the user wants to communicate with: the ability to display the profiles of the synced members; the ability to communicate with the synced members through a native language; and the ability to create a voice profile of each of the synced members. In fact, in many of the preferred embodiments, these advantages are optimized to an extent that is considerably higher than heretofore achieved in prior, known social media application platforms.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

Figure 1:
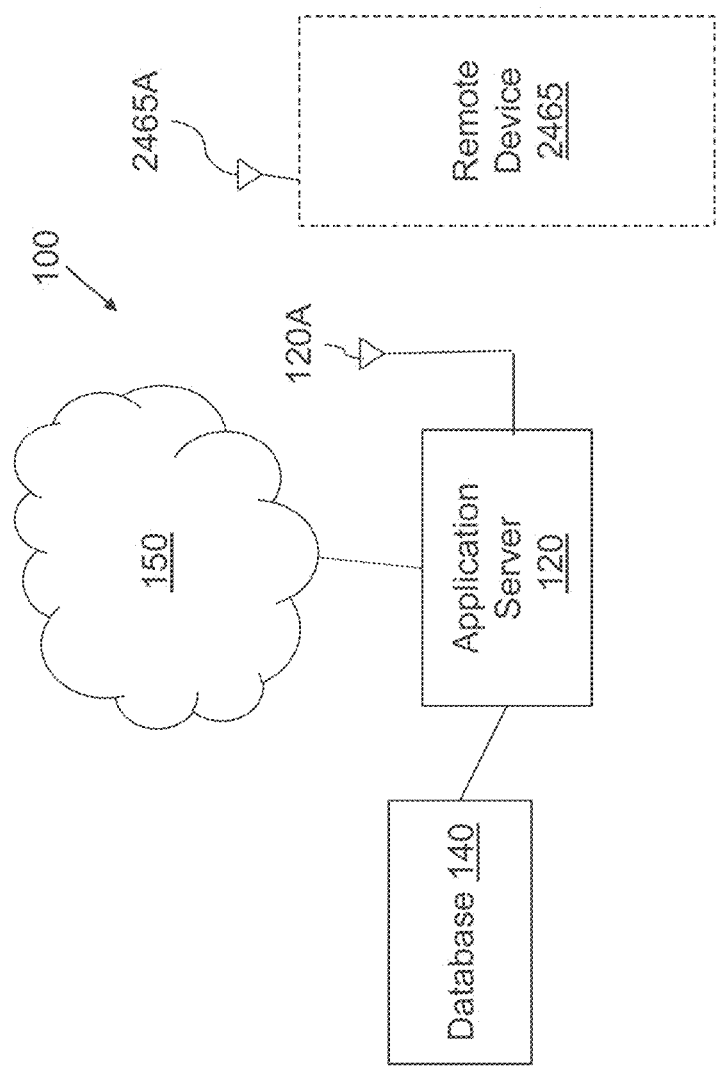
FIG. 1 illustrates one embodiment of a system for supporting a social media application platform (app) for exchanging voice messages.

In order to address the shortcomings of the prior, known social media application platforms (apps), it would be desirable to utilize a social media application platform that revolves strictly around the exchange of voice messages. Also, the messages should range from 1 to 60 seconds. Finally, the user cannot use text to communicate. In particular, the novel social media application platform of the present invention strictly focuses on the unedited and genuine human voice. In fact, users are only permitted to upload one photo for their profile.

In particular, in some of the embodiments of the present invention, a main feature of the present invention revolves around the exchange of voice messages between users. There also exists a feed which consists of people the user can "sync" with that is only in voice memo format. Furthermore, the social media application platform has a very neat and new design scheme for the user conversations. In particular, it is in cube format vertically and horizontally. There also exists a feature where the user can display on his/her profile the top five (5) wavelengths that the user is in contact with on a regular basis. Eliminating camera and gallery uploads (except for a profile picture) allows the profile to only demonstrate the user's most authentic voice and spirit.

The present social media application platform is the most practical and simple way to communicate with others. Through its simplicity, one can talk and get a point across with the exact inflection one desired—no more misunderstandings through text. This app appreciates verbal slang and mannerisms that text often conceals due to its written focus. Also, for users who speak more than one language, voice messages are the most practical since one no longer must switch between keyboards while typing. One can speak English, Arabic, Mandarin, or other languages that are tough to text but easier to vocally communicate. One would no longer worry about misspelling a word or autocorrect attempting to fix a word one intentionally meant to type in their message.

Furthermore, as a speech and audio-based social media application platform, the present social media application platform will be a fun and casual way to connect and talk with the users friends via voice messages. This app can also be used for new couples who have recently started dating, but do not want to feel the pressure of having live conversations on the phone just yet. In addition, one would have the opportunity to "sync" with influencers or celebrities. Comedians, musicians, entertainers, and podcast hosts alike will use this application platform to promote their work and daily lives. Many other communities such as people with vision impairments and those interested in autonomous sensory meridian response (A.S.M.R.) will appreciate the presence of a speech and audio-based app due to the inherent need for such platforms.

Finally, the present social media application platform allows the user to judge another user based on the words used in a voice message and how one speaks rather through physical appearance from provided photos. One can only send voice memos to one another if both users are "synced" with each another. A "voicevault" would allow the user to store voice memos that the user can save from select conversations. In the future, the user may be able to feature a song on his/her profile page.

With reference to FIG. 1, one embodiment of a system 100 for supporting a social media application platform that utilizes the exchange of voice messages is illustrated. The system 100 includes, for example, an application server 120 having a network interface(s) to communicate with a network 150 and one or more remote databases 140. One or more remote devices 2465 (e.g., client devices, computers, mobile devices, etc.) may connect with the application server 120 via the network 150 to access the data from the database 140.

In one embodiment, remote device 2465 can be, but is not limited to, a smartphone, tablet, laptop or other similar computing device that is capable of interacting with the application server 120 through a network connection (e.g., network interface, transceiver, etc.). Furthermore, remote device 2465 should be capable of allowing a user to interact with application server 120 through a mobile application or browser that can be accessed by the remote device 2465. In one embodiment, remote device 2465 can interact with application server 120 and network 150 through transceivers 2465A and 120A. As will be discussed in greater detail later, a mobile application or browser on the remote device 2465 will allow the user to interact with the application server 120 in order to allow the user to run an application on the remote device 2465 and access data on the database 140 via the application server 120.

Figure 2:
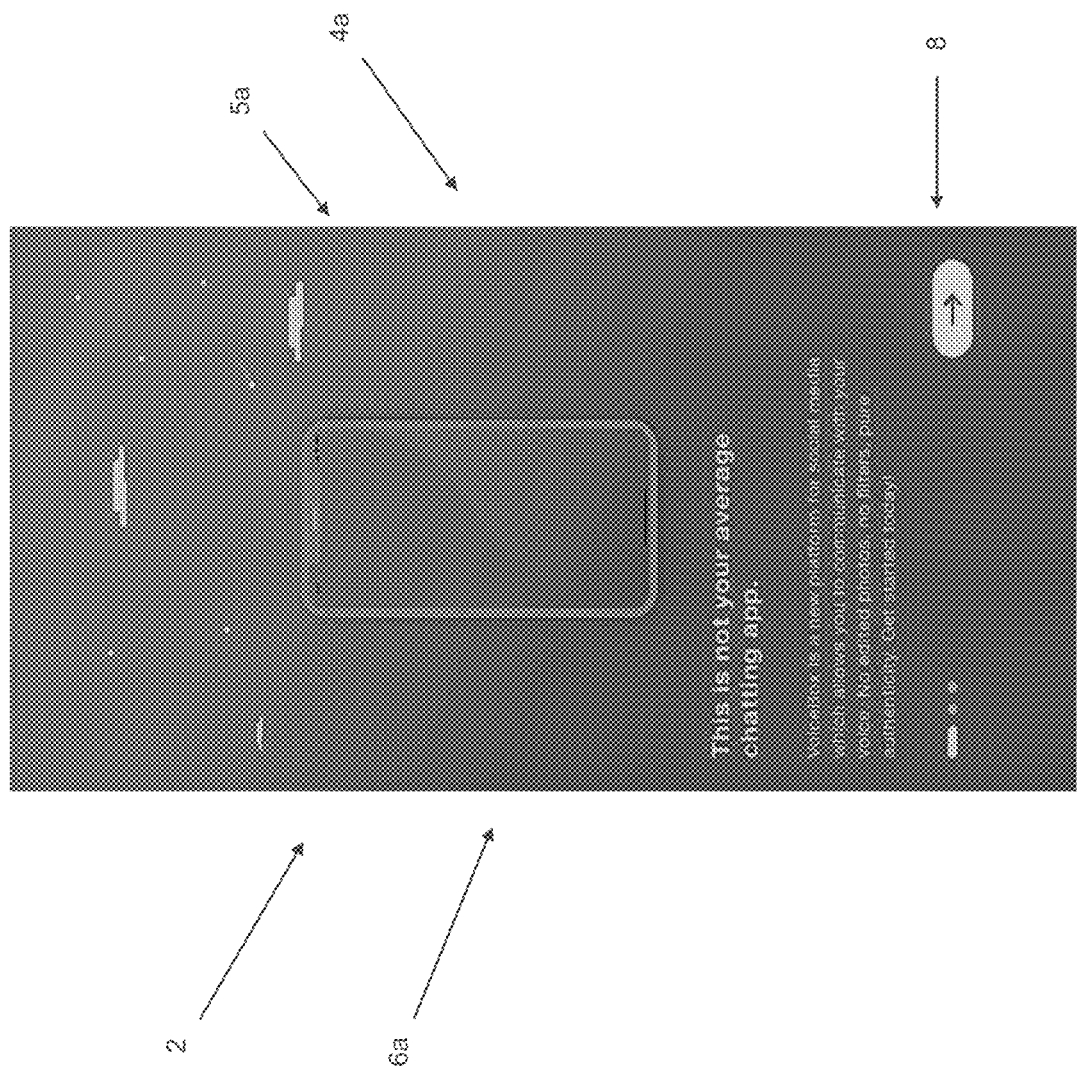
FIG. 2 is an illustration of an introductory feed page of what appears to the first-time social media application platform (app) user and showcases a general idea of the features of the social media application platform, constructed according to the present invention.

Furthermore, social media platform logic 2430 (FIG. 24) is configured to generate a graphical user interface (GUI) on the remote device 2465 to facilitate user interaction with the social media application platform (app) 2 (FIG. 2). For example, social media platform logic 2430 includes program code that generates and causes the graphical user interface to be displayed based on an implemented graphical design of the interface. In response to user actions and selections via the GUI, associated aspects of app 2 may be manipulated.

In one embodiment, social media platform logic 2430 is configured to facilitate receiving inputs and reading data in response to user actions. For example, social media platform logic 2430 may facilitate selection, reading, and inputting (including recording) of data into the GUI. The data may reside in data structures (e.g., within database 140) associated with (and accessible by) app 2 via the server 120. The data may be read into data structures in a memory associated with social media platform logic 2430, for example. Furthermore, social media platform logic 2430 is configured to facilitate the outputting (including playing) and displaying of data, via the graphical user interface, on a display screen of the remote device 2465.

Figure 3:
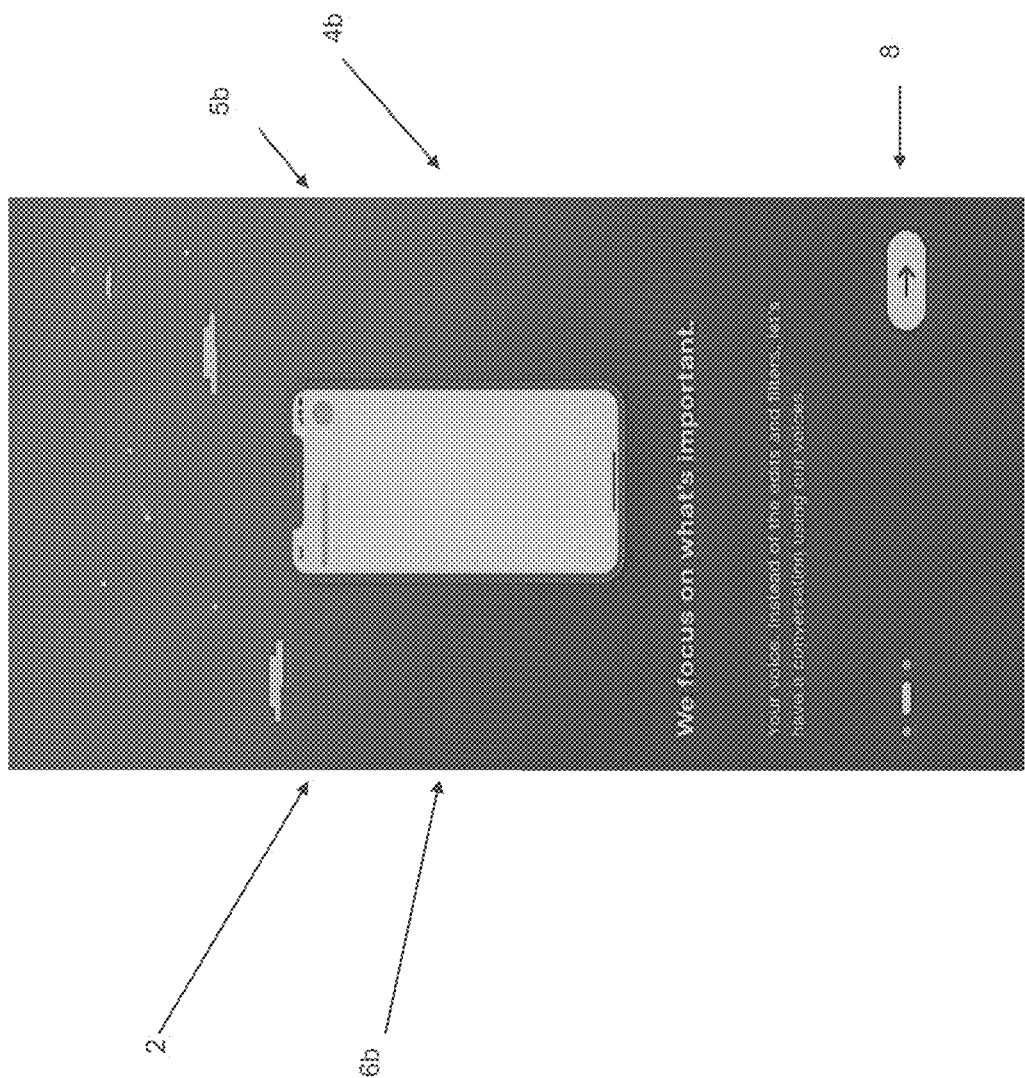
FIG. 3 is an illustration of another introductory feed page of what appears to the first-time app user and showcases another general idea of the features of the social media application platform, constructed according to the present invention.
Figure 4:
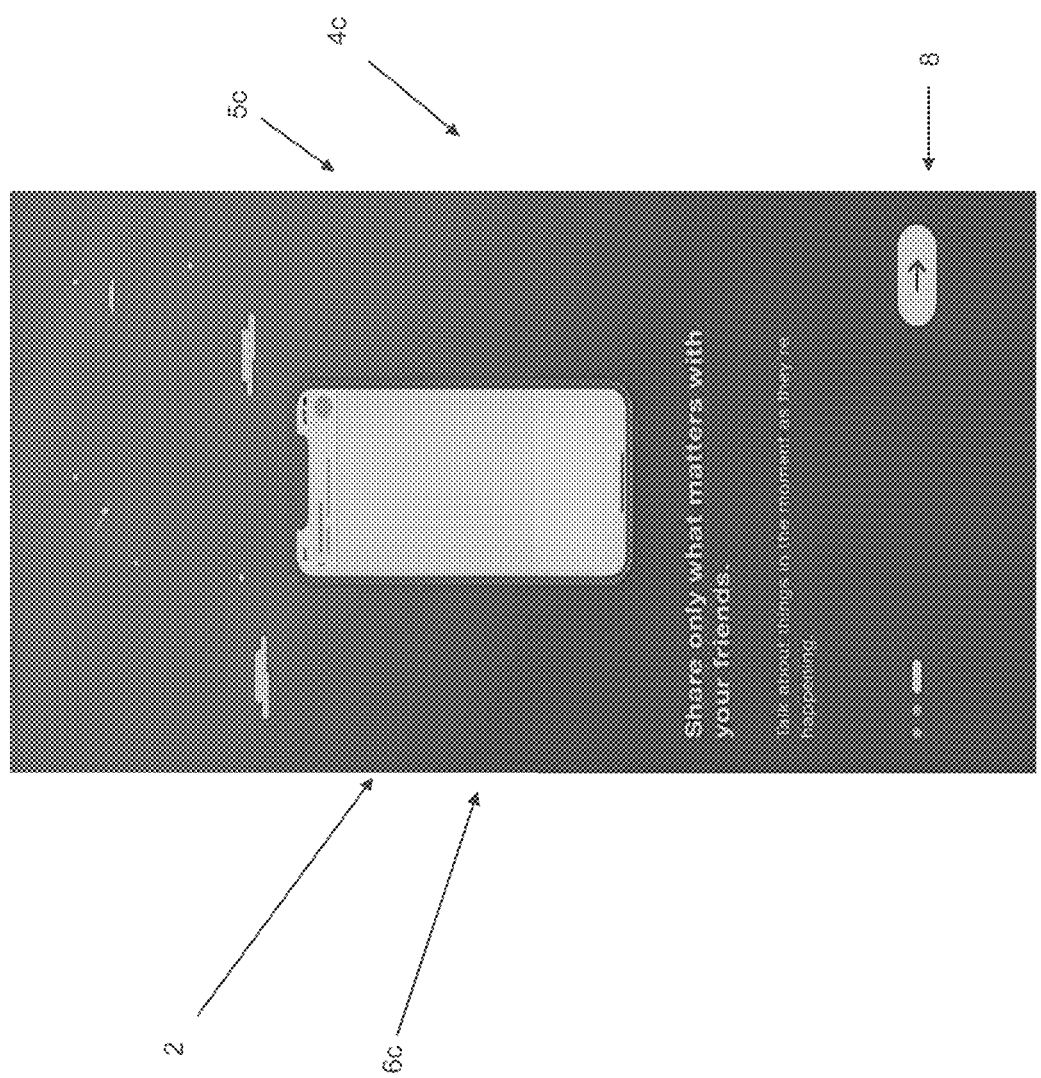
FIG. 4 is an illustration of a final introductory feed page of what appears to the first-time app user and showcases another general idea of the features of the social media application platform, constructed according to the present invention.

Reference is made now to FIGS. 2-4, there are illustrated introductory feed pages 4a, 4b, and 4c that show what appears to the first-time social media application platform (app) user. Also, these pages 4a-4c showcase the general idea of the features of the app 2. In one embodiment, the pages 4a-4c and subsequent pages to be discussed in greater detail later will be configured by the social media platform logic 2430 (FIG. 24) and application server 120 of FIG. 1.

It is to be understood that FIGS. 2-23 illustrate one embodiment of a computer-implemented method, which can be performed by a computing device configured with app 2 for exchanging voice messages. The app 2 is configured to process data in electronic form and includes stored executable instructions that perform the functions of the method.

In particular, in one embodiment, FIG. 2 is a template 5a conventionally generated on page 4a by social media platform logic 2430 that emphasizes what distinguishes the app 2 from other social media and networking application platforms. FIG. 3 is another template 5b conventionally generated by social media platform logic 2430 on page 4b that emphasizes the primary method of communication on app 2 and it describes why app 2 is different by explaining what app 2 does not contain. Finally, FIG. 4 is another template 5c conventionally generated on page 4c by social media platform logic 2430 that describes the usability of the app 2 and how one will use app 2 to talk about what is going on in their daily lives. It is to be understood that these templates 5a-5c are pictures of what the app will look like on a smartphone or other similar portable communication/computing device.

In another embodiment, FIGS. 2-4 represent introductory pages 4a-4c that will be used to introduce the app 2. It is to be understood that the images 6a, 6b, and 6c are conventionally available stock images that are conventionally generated by social media platform logic 2430 on templates 6a-6c, respectively. A unique aspect of the present invention is that pages 4a-4c would provide information about app 2 that was downloaded by the user.

Furthermore, upon downloading the app 2, the app 2 is configured to present to each user the onboarding introductory pages 4a-4c. In one embodiment, these introductory pages 4a-4c will be used to assist the user to understand what the app 2 is about. In particular, FIGS. 2-4 will give different images 6a, 6b, and 6c of three different parts of the app 2 so that the user can get introduced to the app 2. In particular, in one embodiment, from FIG. 2, once the user clicks or otherwise interacts with the arrow button 8, the app 2 is configured to take the user to FIG. 3. In FIG. 3, once the user clicks or otherwise interacts with the arrow button 8, the app 2 is configured to take the user to FIG. 4. Once the user clicks or otherwise interacts with arrow button 8, the app2 is configured to take the user to FIG. 5 which is the signup page 4d.

Figure 5:
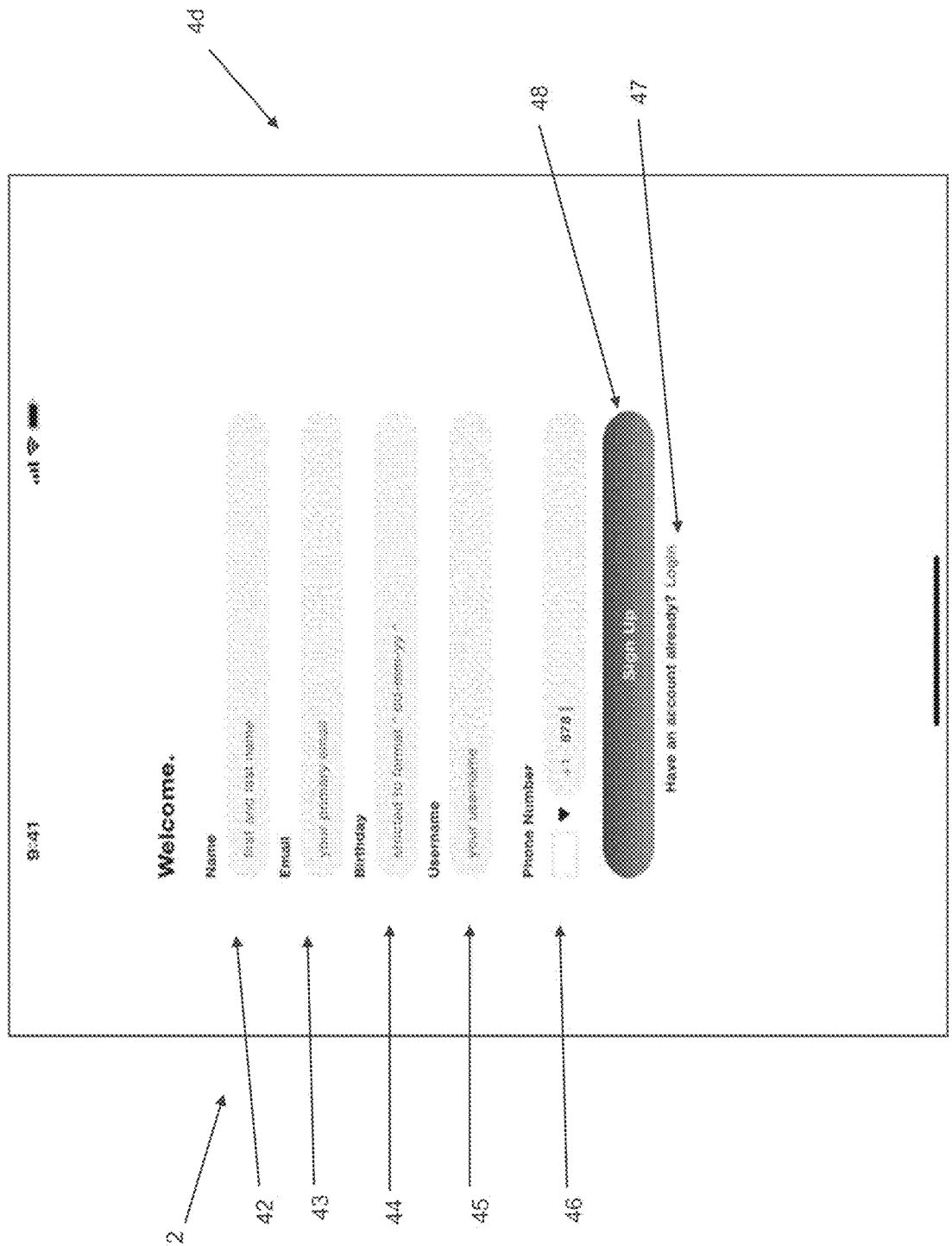
FIG. 5 is an illustration of a feed page for entering a user's personal information and signing up for the social media application platform, constructed according to the present invention.

With respect to FIG. 5, FIG. 5 illustrates the signup page 4d on how the user can create and make an account on the app 2. In one embodiment, the app 2 is configured such that the signup page 4d will illustrate user information sections and signing up with the user information such as name 42, email address 43, birthday 44, username (@) 45, and the user's telephone number 46. Furthermore, this signup page 4d shows where in the sign-up page 4d the user inputs name 42, email address 43, birthday 44, username (@) 45, and telephone number 46.

In one embodiment, for each of these user information sections, the user will use a conventional user interface (i.e., a mobile device user interface or text input 2480 (FIG. 24)) to enter the requested information that the user will need to provide in order to create the user's account on the app 2. In particular, the app 2 is configured to allow the user through the user interface to enter his/her name, birthday, email, phone number, and username/@ information. The app 2 is configured to then display on the user's profile page (FIGS. 14 and 15) as the user's name 42. Another unique aspect of the present invention is that this is one of the ways the user will be identified, and this user information can be edited later in the profile edit page 4m (FIG. 17) within the app 2.

Another unique aspect of the present invention is that the user's name 42 will be the primary method of identification on the app 2. The email address 43 will be used to send the user verifications, security updates, and protect the user's account. The telephone number 46 will also be used to provide the user with a two-factor authentication. Also, the phone number 46 will be used when the user connects to another user's telephone number in that the address book in the contacts page 4o (FIG. 19) within the app 2 will allow the user to find people in the user's contacts list that also use the app 2 so that the user could connect and add other app users to the user's network through the app 2, as described in greater detail. The user's birthday 44 will provide protection on the app 2 by ensuring the content of app 2 is age appropriate. Furthermore, the birthday 44 can also be used to send the user's friends and the people the user synchronizes with a birthday reminder notification as to when it is the user's birthday. The username 45 is the user's personalized "@" and will be the handle other users of app 2 will use in the search bar in the contacts page 4o to find the user's account and sync with the user. Finally, upon completion of all of the user information sections, the app 2 is configured to allow the user to sign up and start the process of creating the user's account on the app 2.

Figure 9:
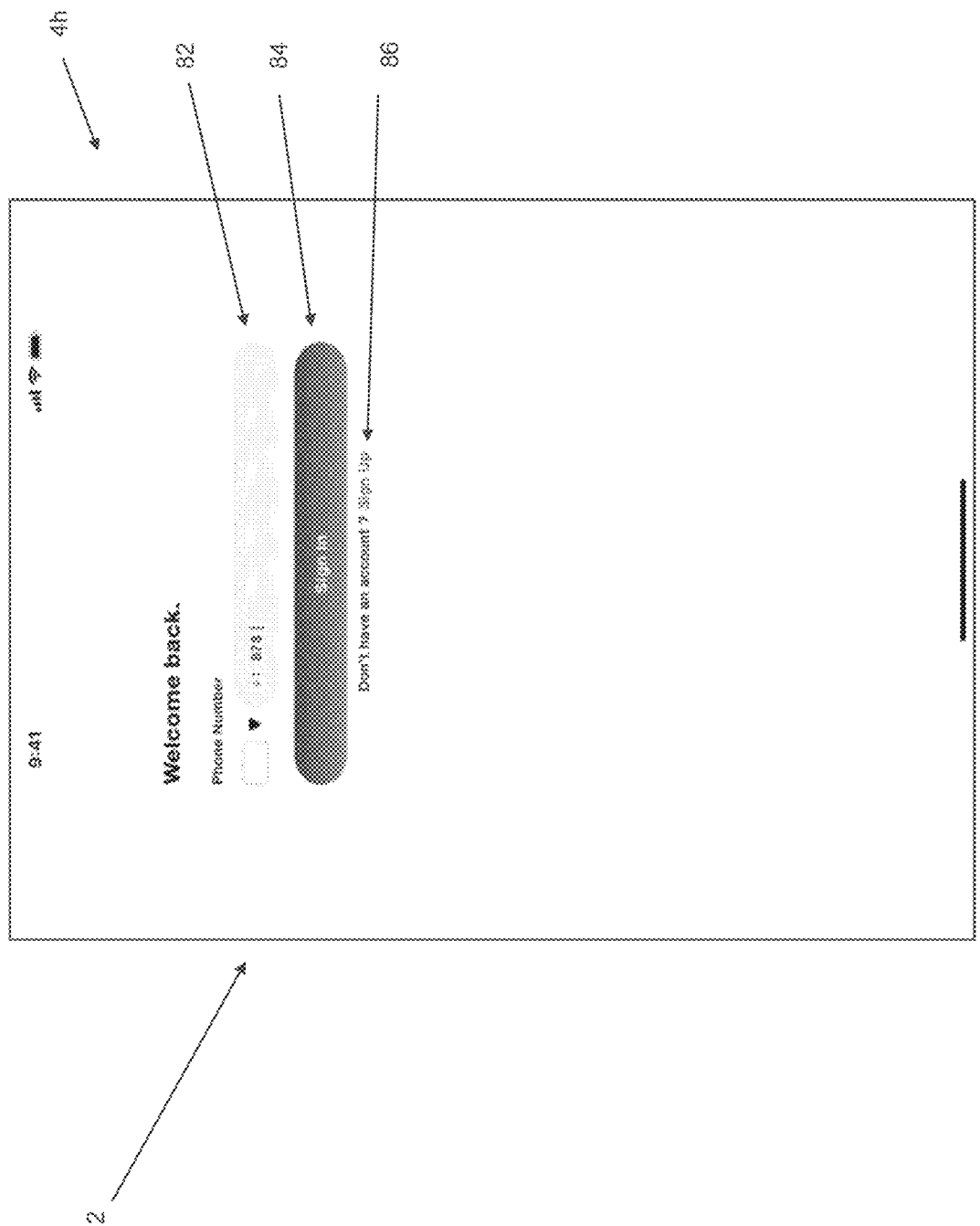
FIG. 9 is an illustration of a feed page for entering a user's log-in information for entering the social media application platform, constructed according to the present invention.

If the user already has an account, the user simply clicks or otherwise with button 47 and the app 2 is configured to take the user to the login page 4h (FIG. 9). In particular, upon interacting with the button 47, app 2 is configured to take the user to login page 4h so that the user will be able to login to the user's already existing account which is saved and stored by database 140. Conversely, upon clicking or otherwise interacting with button 48, the app 2 is configured to cause the user to proceed to FIG. 6 for user verification.

Figure 24:
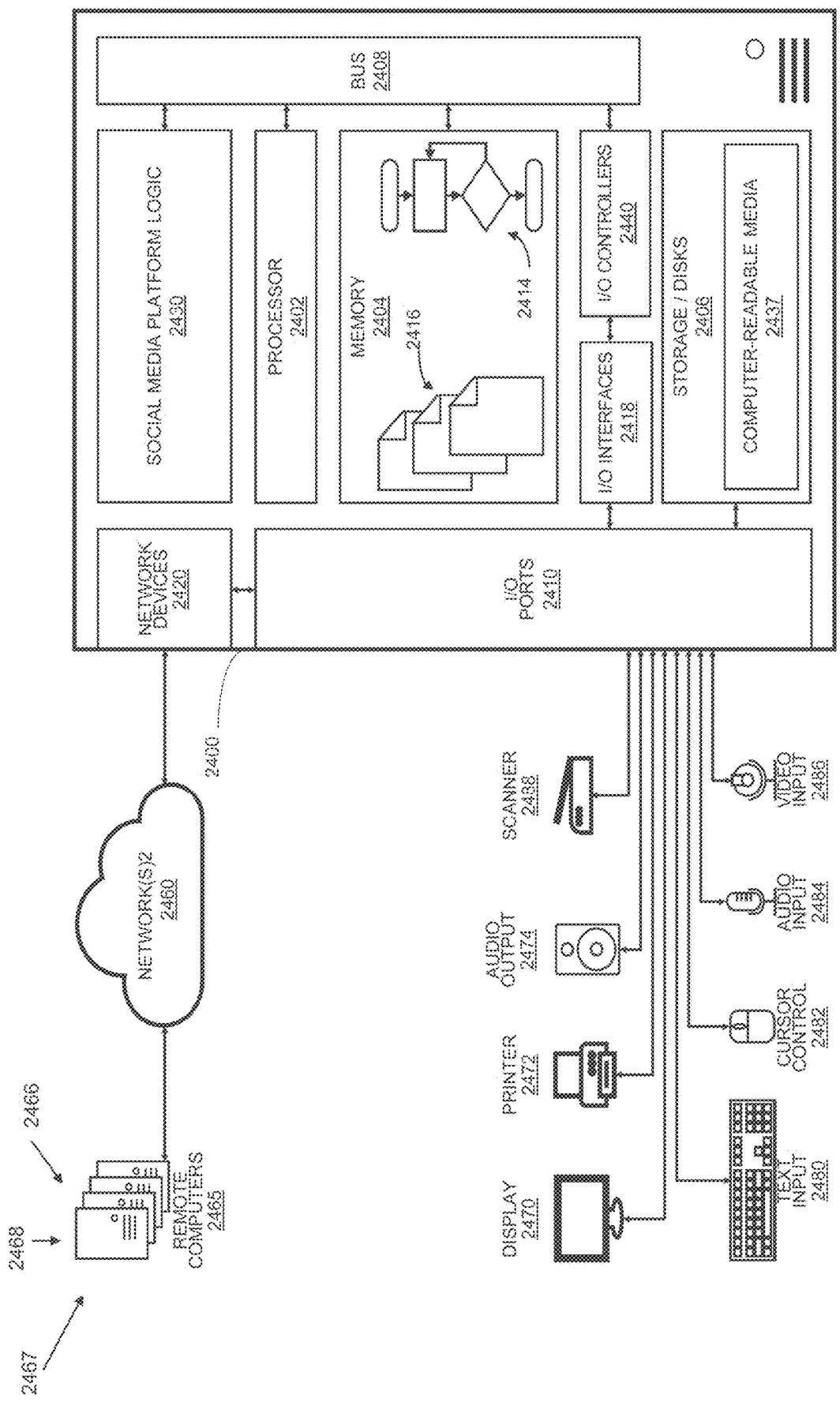
FIG. 24 illustrates an embodiment of a computing system configured with the example systems and/or methods disclosed.

Another unique aspect of the present invention is that app 2 is configured to collect the user information discussed above in relation to FIG. 5 and store the user information as encrypted data 2416 in memory 2404 (FIG. 24). App 2 is then configured to then transfer the information into a readable file by the server 120. Furthermore, the app 2 is configured that once the user information is received by the server 120 in the readable format, the processor 2402 is configured to then decrypt the encrypted data 2416 utilizing a conventional AES-256 bit bank grade encryption. The processor 2402 is then configured to transfer the decrypted information to the memory 2404 into separate database tables which are configured to be locked and the processor 2402 is configured to encrypt the information into a private key file which is only accessible via the server 120 and app 2. In this manner, the app 2 saves the user information in the memory 2404 and by doing so, when the user creates the account and relogs in, app 2 will remember the user's information and account.

Figure 6:
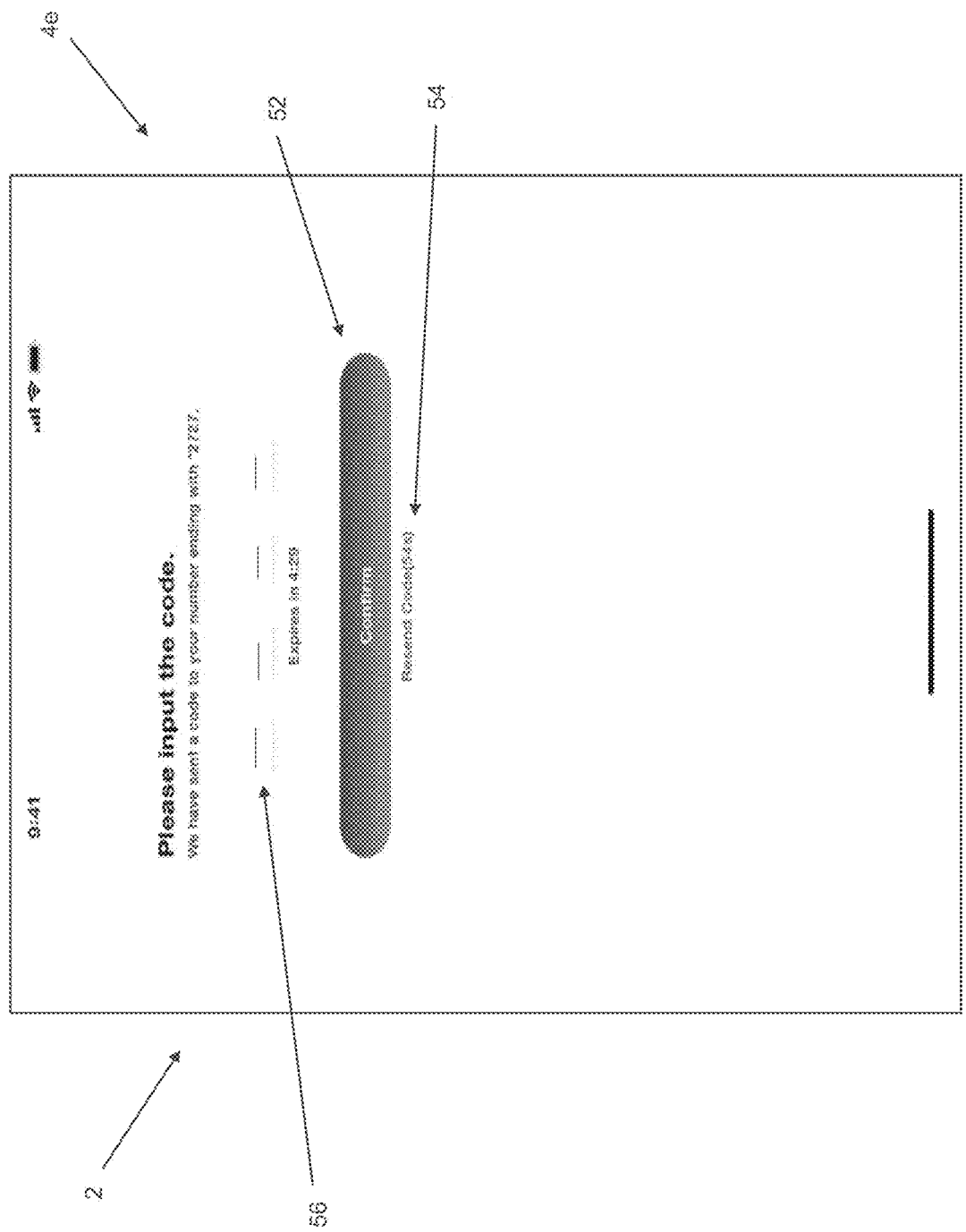
FIG. 6 is an illustration of a feed page for entering a user's two-factor authentication information, constructed according to the present invention.

With respect to FIG. 6, FIG. 6 illustrates a standard text verification page 4*e* that the user will receive to the user's SMS on the user's mobile computing device 2465. The app 2 is configured to display this verification page 4*e* after the user provides the requested user information as discussed above in FIG. 5 and interacts with the clicks on the sign-up button 48. Another unique aspect of the present invention is the user receives a code to the user's SMS or email in order to protect the user's account and add a layer of privacy that is protecting the user's account on app 2.

Upon interacting with the sign-up button 48, the app 2 is configured to send a code (i.e., a numeric code) to the user's SMS or email. When the code is sent to the user's phone, the user will then enter the code at area 56 in order to secure the user's login/account. There is also a resend code button 54 if the user did not enter the code fast enough or there is a glitch or bug in where the code was not properly sent to the user. Another unique aspect of the present invention is that the app 2 is configured to provide a timer. In one embodiment, if a running time of five (5) mins expires before the code is entered in area 56, then the app 2 is configured to time out the input in the code session and the user must request another code by interacting with resend code button 54. This is another mechanism configured in app 2 to protect the user's account.

After the code is entered into verification page 4*e* at area 56, the user then clicks on or otherwise interacts with confirm button 52 in order to secure the user's account. As will be discussed in greater detail later, the user will be able to sign into app 2 through the user's email or phone number that the user previously entered when signing up for the app 2. When the account is created, the user will be able to re-login in using the username that the user created. This also opens the door for two-factor authentication.

Figure 7:
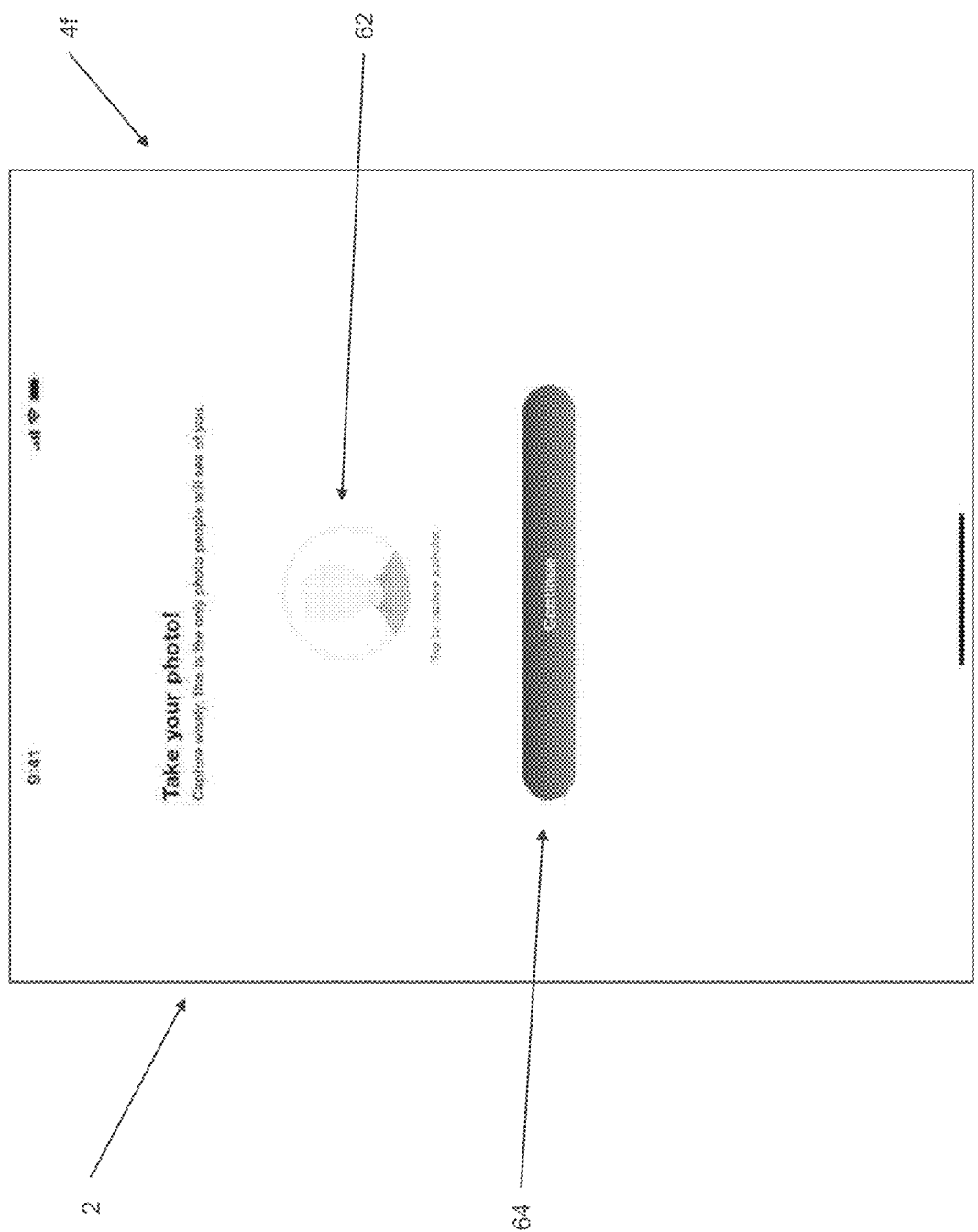
FIG. 7 is an illustration of a feed page for entering a user's profile picture using the user's live mobile device (i.e., smartphone) camera, constructed according to the present invention.

Regarding FIG. 7, there is illustrated the take the photo page 4*f*. In this take the photo page 4*f*, the app 2 is configured to allow the user to access the app 2 so that the user can use a camera 2466 or other similar video device on the user's mobile computing device 2465 (i.e., a smartphone) to take a picture that will be used as the user's profile picture.

Another unique aspect of the present invention is that access to the user's photo library or gallery is not permitted for this profile picture selection process. A user's profile picture will only be allowed to be uploaded through mobile computing device's camera 2466 in order to eliminate fake accounts, catfishing, and adds another layer of natural security for user's who choose to be an anonymous account by taking a picture of a scene, a location, a company, a restaurant, a brand, or a blank color or wall, etc. However, this feature of the present invention will show to other users that this account did not use a real photo of themselves and can be a layer of protection for that user. When the user clicks on or otherwise interacts with the picture button 62 (e.g., "tap to capture a photo"), the app 2 is configured to interact with the camera 2466 on the mobile computing device 2465 to take a photograph of the user and the mobile computing device 2465 is configured to upload the desired photograph of the user to the app 2. It is to be understood that the user may take several user profile pictures. The user simply selects the desired user profile picture from the plurality of user profile pictures to be displayed as the user profile picture.

Figure 8:
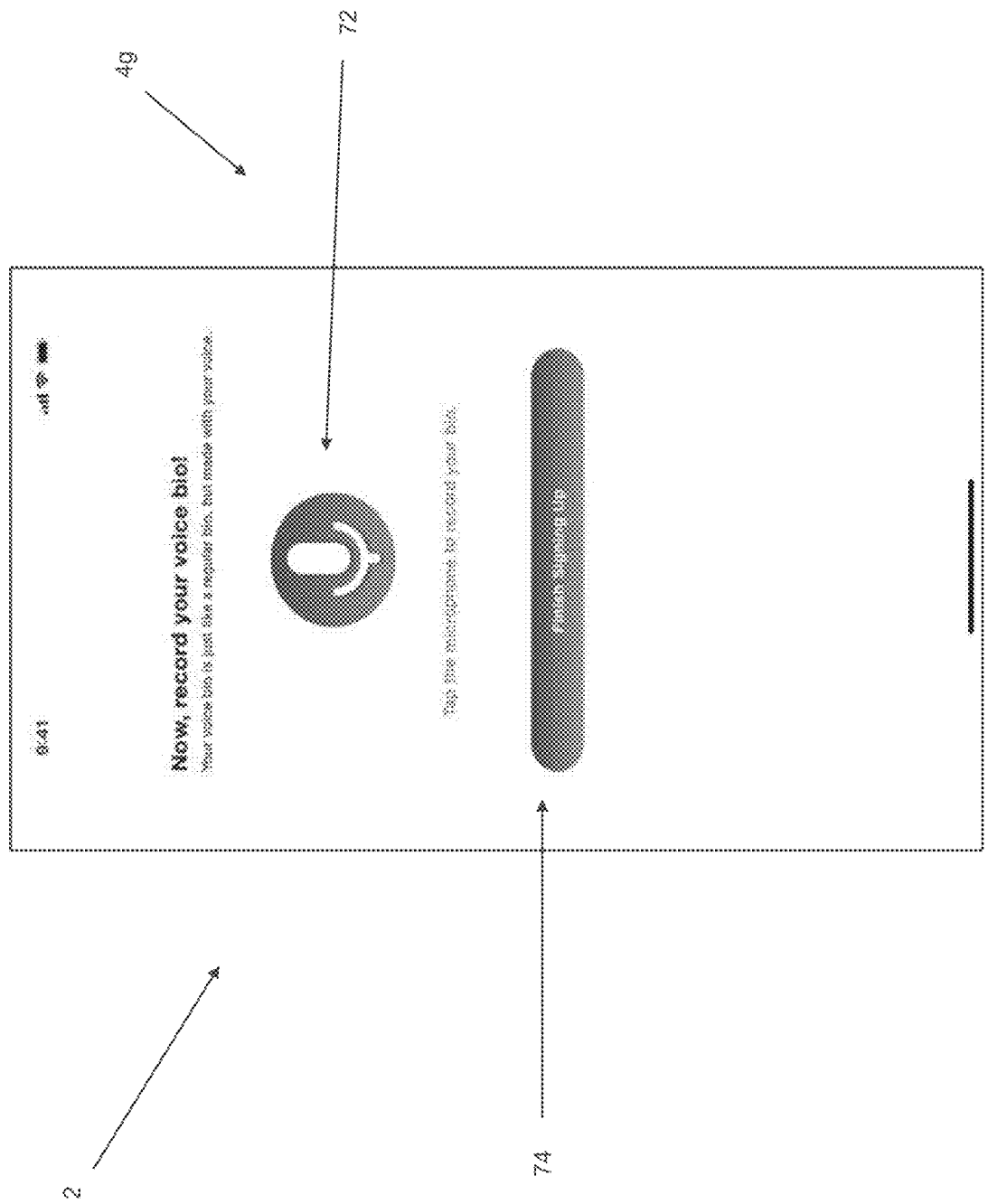
FIG. 8 is an illustration of a feed page for entering a user's profile voice biography, constructed according to the present invention.
Figure 17:
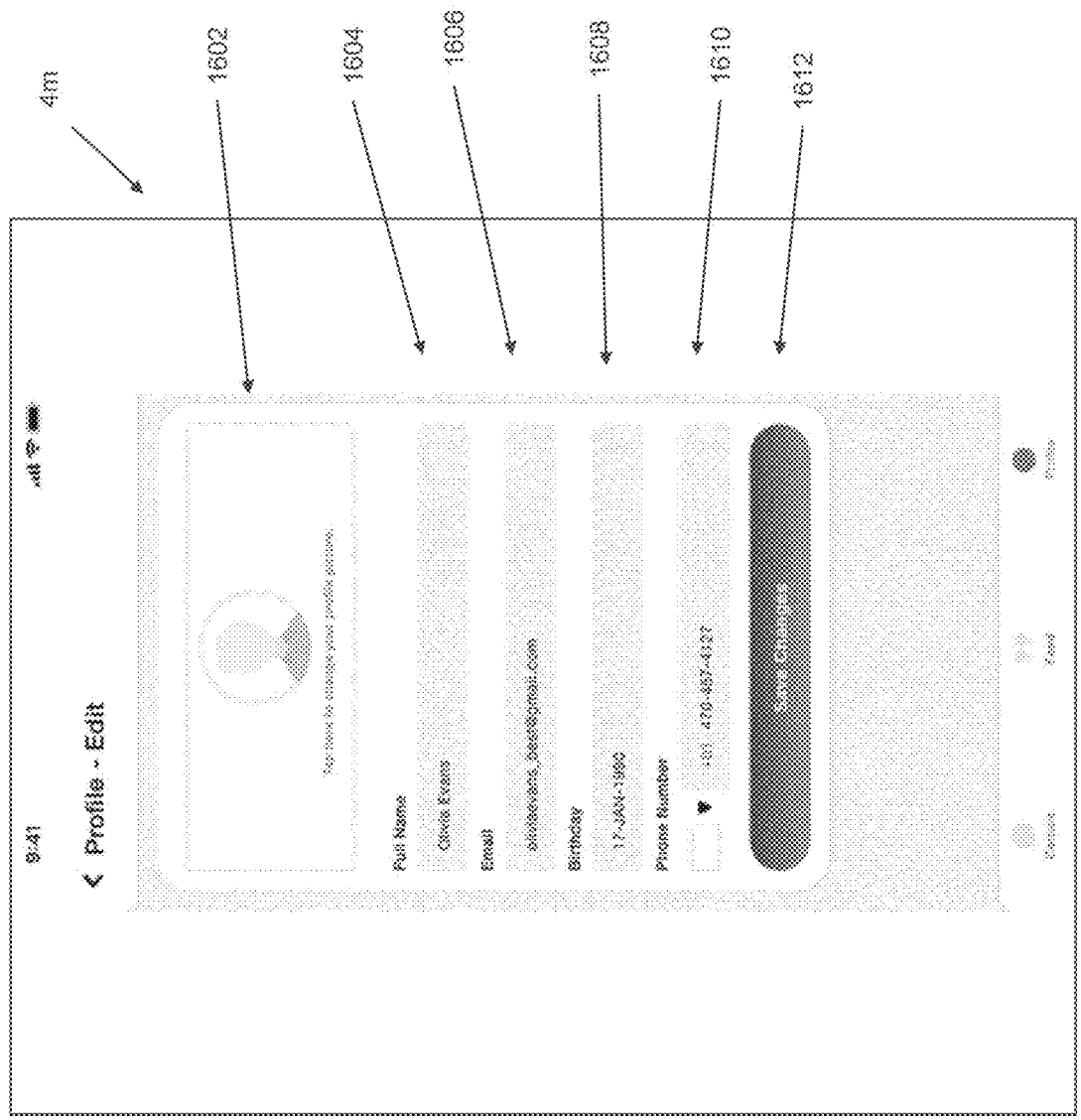
FIG. 17 is an illustration of a feed page which shows the users profile editing page, constructed according to the present invention.

When the user selects the profile picture that the user wants, the user clicks on or otherwise interacts with the continue button 64. If the user wants to retake the profile picture, the user will be able to retake the profile picture once the user 1.) reaches the settings in the profile tab on the user's homepage 4*i* (FIG. 10), 2.) then interacts with the settings on profile page 4*k* (FIG. 15), 3.) then interacts with a profile edit at the top of the settings section on profile page 4*k* (FIG. 15) in where the user can retake the photo on profile-edit page 4*m* (FIG. 17). The app 2 is configured to then direct the user to the record your voice bio page 4*g*, as shown in FIG. 8. If there is no user profile picture, the app 2 is configured to add a conventional stock grey photo of a person's outline or the user's initials. It is to be understood that the user is not required to upload a profile picture. However, if a user profile picture is not uploaded to the app 2, the app 2 is configured to show that the user is an anonymous instead of being declared.

Regarding FIG. 8, the record your voice bio page 4*g* allows the user to record the user's voice bio which appears on the user's profile (FIGS. 14 and 15) where the user can edit his/her voice bio and listen to it there on the speaker 2468 attached to the mobile computing device 2465. In particular, when the user clicks on the microphone button 72, the app 2 is configured to enable the user to use the microphone 2467 on the user's mobile computing device 2465 to record a voice bio of the user that is a maximum of 30 seconds. It is to be understood that the user can record multiple voice bios until the user records the desired voice bio that the user wants to appear on the user profile page 4*k*.

A unique aspect of the present invention is that when other users view the user's account, the other users will be able to listen to the user's voice bio and glean some information about the user. When the user clicks on the finish signing up button 74, the app 2 is configured to direct the user to the welcome back/login page 4*h* (FIG. 9) or the app 2 is configured to take the user to the user's homepage 4*i* (FIG. 10) for the first time.

Another unique aspect of the present invention is the recording of the user's voice bio. Recording the user's voice bio is important because this is going to be the introduction to who the user is on the user homepage 4*i* and an opportunity to share the user's personality and authenticity. It is to be understood that the voice bio files that are created by the app 2 are also encrypted and stored in the database 2402 by the app 2 through the same transfer process by the app 2 as the previously discussed signup process. In particular, the voice bio is received by the server 120 in the readable format, the processor 2402 then decrypts the encrypted voice bio files utilizing conventional AES-256 bit bank grade encryption and transfers the information to the database 2404 into separate database tables which are then locked and encrypts the information into a private key file which is only accessible via the server 120 and app 2 itself. Within that process, when a user sends a recording of audio as a voice bio, the app 2 is configured to send this piece of audio to the server 120 using the same process described earlier. Then, when the voice bio is played within the app 2, whether by the user or third-party user, the app 2 is configured to find and retrieve the audio of the voice bio from the server 120 and utilize the same processes that were used to send and receive the data. This is part of the framework of app 2 due to app 2 focusing mainly on utilizing voice messages and using the sound files to communicate and share ideas and thoughts.

With respect to FIG. 9, there is illustrated welcome back/login page 4*h*. This is the page where the user will login to app 2. The user can login through the drop-down menu 82 by using either the user's phone number, username, or email. In particular, the user selects the method of logging in (i.e., phone number, username, or email) and enters the required information into the drop-down menu. As shown in FIG. 9, the user selected the user's telephone number. Once the user enters the required information (e.g., the user's telephone number) into drop-down menu 82, the app 2 is configured to allow the user to sign into the app 2.

In the event that the user gets to the welcome back/login page 4h and the user does not have an account, the app 2 is configured to direct the user to the signup page 4d (FIG. 5) and create an account, as previously discussed. In particular, the user can click on button 86 so that the user is directed back to the signup page 4d. Once the user clicks the login button 84, the app 2 is configured to direct the user to FIG. 10.

In one embodiment, when the user logs in, the app 2 is configured to save and remember the user. When the user logs out, the user will have to log back in. If the user logs into the app 2 on a remote computing device 2465, app 2 is configured to allow the user to stay logged into app 2 until the user logs out of app 2. If the user logs in through another a remote computing device 2465, app 2 is configured to not log out the user from the other remote computing device 2465.

Figure 10:
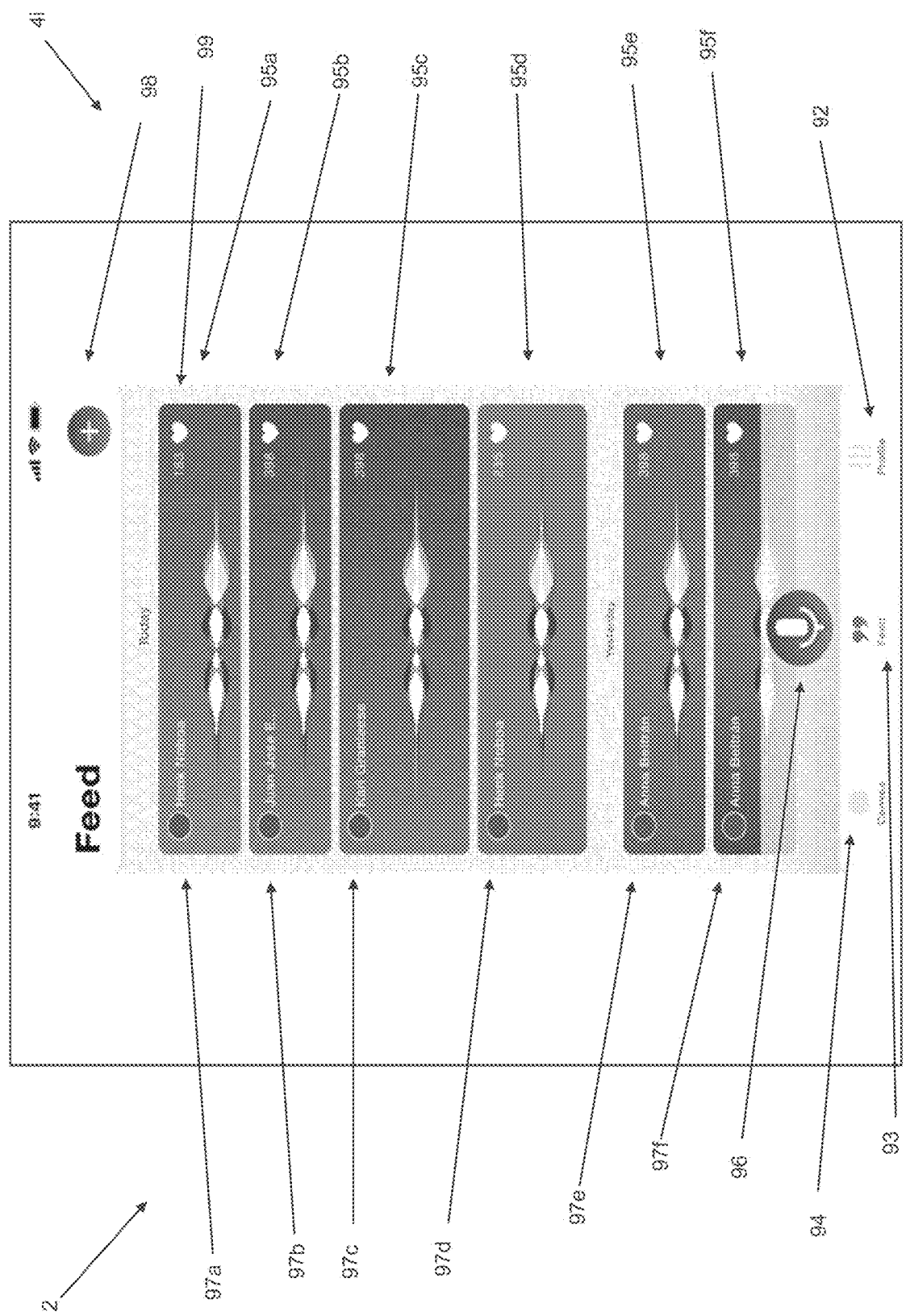
FIG. 10 is an illustration of a feed page which shows voice memos from people that are in the user's network (other app users that have "synced" with the user), constructed according to the present invention.

Regarding FIG. 10, once the user successfully logs into their account, the user is redirected to the homepage 4i, where the user can access the soundboard/feed. This is what the app 2 looks like when the user is logged in. Located at the bottom of the homepage 4i are the profile button 92, the feed button 93, and the conversations (convos) button 94. The app 2 is configured so that when these buttons 92-94 are clicked by the user, the app 2 directs the user to different pages of the app 2 (FIGS. 10, 14, and 19, respectively), as will be discussed in greater detail later. In one embodiment, the homepage 4i is where the user will find the posts 95a-95f of the other users that the user is "synched" with. The app 2 is configured to upload these posts 95a-95f to the homepage 4i so that the user can click on each of the posts 95a-95f and listen to them.

Figure 11:
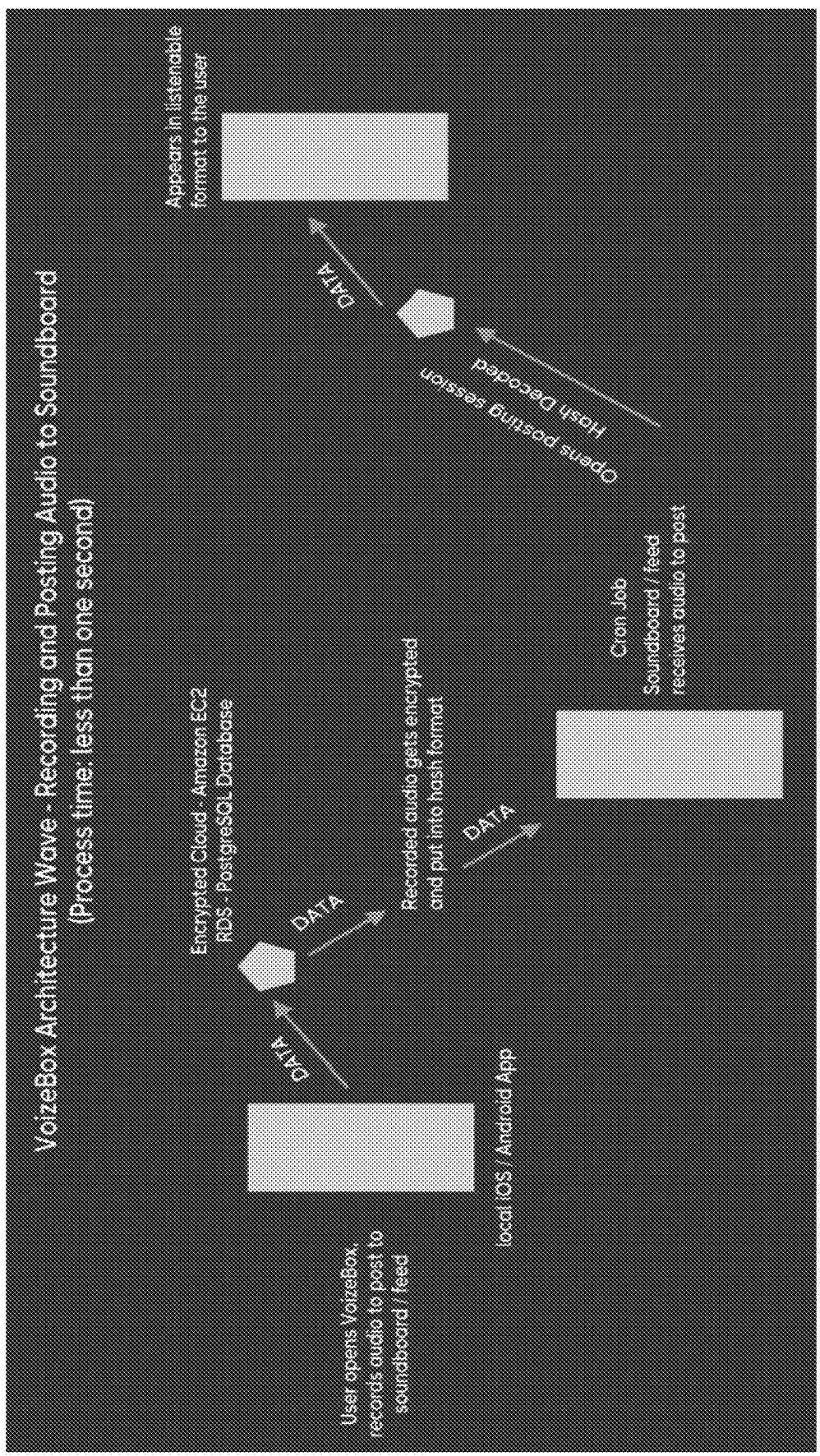
FIG. 11 is a schematic illustration of the steps of recording and posting audio to the soundboard, according to the present invention.

With respect to FIGS. 10 and 11, FIGS. 10 and 11 describe and depicts how the recording and posting of user's audio to the homepage 4i works as well. The homepage 4i includes, among other things, the soundboard/feed. In particular, homepage 4i is where, by clicking on a post 95a-95f, the user can listen to people (other users) that the user follows (or is synchronized with) and hear about those people's updates on life, what they're doing or whatever they choose to talk about. Homepage 4i is where the user will listen to people and like posts 95a-95f according to what the user's opinion and view is on what the other users posted. The purpose is for people to connect and share what is going on in voice memo format which makes it more real and connects others in a more human way.

Figure 12:
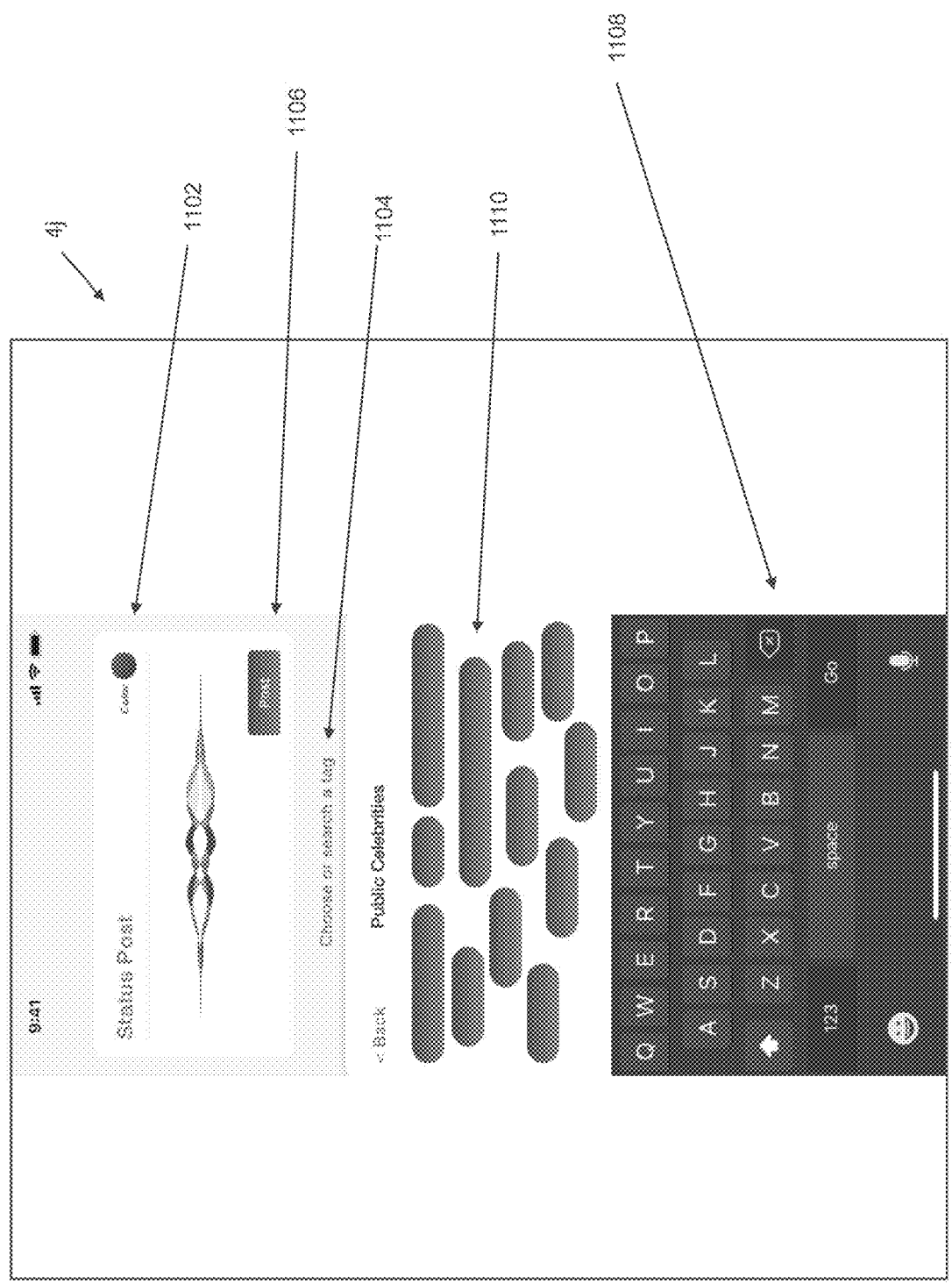
FIG. 12 is an illustration of a feed page which allows the user to select what group or "frequency" that the user can put his/her memos under so that they are in a community that is relevant to the user, constructed according to the present invention.

Upon clicking the microphone button 96, the app 2 is configured to direct the user to FIG. 12 and allows the user to record and then share the user's own post that can be shared with the people that sync to (or follow) the user. In particular, a conventional microphone 2467 located on the remote computing device 2465 can be used to record the user's post. In one embodiment, the app 2 is configured to allow the user to give the posts 95a-95f different colors depending upon the color that the user decides the post 95a-95f should be given. The colors can be chosen from a conventional color wheel (not shown) that the user can access on the remote computing device 2465. This unique aspect of the present invention provides the user with the ability to dictate potential moods through color and make it a personal and creative post for the user's homepage 4i. This also allows for aesthetics to be utilized by the users of app 2. Another unique aspect of the present invention is that the small pictures 97a-97f near the name of each person associated with a post 95a-95f is the profile picture of each of the other people that the user has synched with (followed) so that the user can recognize who they are based on their name and picture.

In particular, when the user taps the audio post 95a-95f (FIG. 10), the app 2 is configured to play the audio (i.e., the voice bio) that the other user posted. When the user taps the heart/like button 99 for a particular user, the app 2 is configured to notify that particular other user that the user liked/hearted the audio post of that other user. Upon clicking the top right plus button 98, the app 2 is configured to direct the user to the contacts page 4o (FIG. 19) and by clicking on plus button 98, the app 2 is configured to allow the user to go to the search bar 1802 and add new friends onto the app 2. When the user taps the microphone button 96, the app 2 configured to direct the user to the status posts tag/frequency page 4j (FIG. 12).

In one embodiment, the microphone button 96 is used to create a new post. The app 2 is configured to upload the posts chronologically which allows the user to see the most recent posts at the top of the user's homepage 4i. When the user scrolls through the posts 95a-95f, another unique aspect of the present invention is that as an effect, the app 2 is configured to make the posts near the middle of the homepage 4i appear larger. It is to be understood that app 2 is configured to display these people (6 as shown in homepage 4i) on the homepage 4i because these are the people that the user wants to synchronize with (follow). It is to be understood that conventional advertisements (not shown) can also be strategically located on the homepage 4i. In one embodiment, the posts 95a-95f will be bigger or smaller height based on the length of the audio which will give the user a more fluid user interface design and usability.

Once the user logs on and sees the voice posts 95a-95f, this means that the people (other users) that the user interacts with wanted to post a voice note to share for other users to hear. As discussed above, the recording of the user's voice is done by pressing on the microphone button 96 and the app 2 is configured to allow the user to record the user's voice, as discussed earlier. The voice information is also retrieved by the server 120 from the database in the same way the server 120 retrieved the voice bio, except that there are multiple voice memos that are being pulled by the server 120 from the database.

With respect to FIG. 12, status post page 4j is illustrated. In particular, status posts are when someone wants to create a post to share using their voice so that they can share their voice, opinion, views, talk about their day or anything that they want. App 2 is configured so that status post page 4j is created by a user clicking through and first recording a voice note as discussed above with respect to FIGS. 10 and 11. In another unique aspect of the present invention, the app 2 is then configured to allow the user to then select through the color wheel 1102, a color for themselves, then search for a hashtag/frequency using button 1104 that the user wants to share which should potentially provide for more syncs and people listening to them. The app 2 is configured to display this color and hashtag/frequency to the user on the homepage 4i and it is presented to the user when someone hits the post button 1106 so that the post is shared on the app 2 for people (other users) to listen to. In one embodiment, the tags/frequencies are ways to get the user's voice note on different niches and groups to find people looking for similar content and sounds. This also will allow the user to find other people like the user, due to creating a community underneath each of these tags and frequencies.

The app 2 is configured to allow the keyboard 1108 to be able to search and find tags and frequencies quicker. As discussed above, upon clicking on the color selection button 1102, the app 2 is configured to display a conventional color wheel 1102 that will allow the user to pick what color the user wants to use for the user's status post. This allows for user creativity and personality.

After the user uses the microphone 96 (FIG. 10), the app 2 is configured to direct the user to status post page 4*j* so that the user can post the audio file to the homepage 4*i*. When the user clicks on the post button 1106, the app 2 is configured to then upload the audio file to the homepage 4*i*. As discussed above, homepage 4*i* is where the user shares the user's thoughts, opinions, and express yourself.

On FIG. 12, there is also tags/frequency tag button 1104 which is used by the user to enter into different niches and find likeminded individuals. The app 2 is configured to display a text box 1110 so that the user can enter information from the keyboard 1108 and search for these niches.

Another unique aspect of the present invention is that the user can make and upload multiple posts a day and share as many memos as the user would like as long as the posts are under 60 seconds in length. The app 2 is configured for communication and sharing the user's voice, which is the most natural and human way of communication. Other users will be able to like the user's post, and in one embodiment, the other users will be able to comment on the user's posts and share opinions as well that can get liked and favorited. This makes app 2 a more real experience and allows the app 2 to actually be about in the moment conversations and authenticity.

The user will be able to share the post by recording it and sending it to someone directly or record and put it in the user's homepage 4*i*. In another unique aspect of the present invention, the posts on the homepage 4*i* can be shared outside of the app 2, however, the app 2 is configured to not share the audio but the app 2 will share the download link for the app 2 so that it makes the user download to app 2 to listen to things on the app 2.

In one embodiment, the app 2 is configured to go through the same transfer process as the signup process which is when the post is received by the server 120 in the readable format, the processor 2302 then decrypts the encrypted folder utilizing AES-256 bit bank grade encryption and transfers the information to the database 2404 into separate database tables which are then locked and encrypts the information into a private key file which is only accessible via the server 120 and the app 2. Within that process, when a user sends a recording of audio as a bio, the app 2 is configured to send this piece of audio to the server 120 based on the process described within. Then, when the voice bio is played within the app 2, whether by the user or third-party user, the app 2 is configured to retrieve the audio file down from the server 120 and utilize these processes back and forth to send and receive the data. It is a very similar process as discussed above, the only difference is that for the colors, tags, and different things within the app 2, they all have their own table and their separate encryption process. The app 2 is configured to upload the audio by retrieving the audio and information from the server 120 and then sharing the audio on the app 2 within the encrypted format. This protects the users on the app 2 and adds a layer of security.

Figure 13:
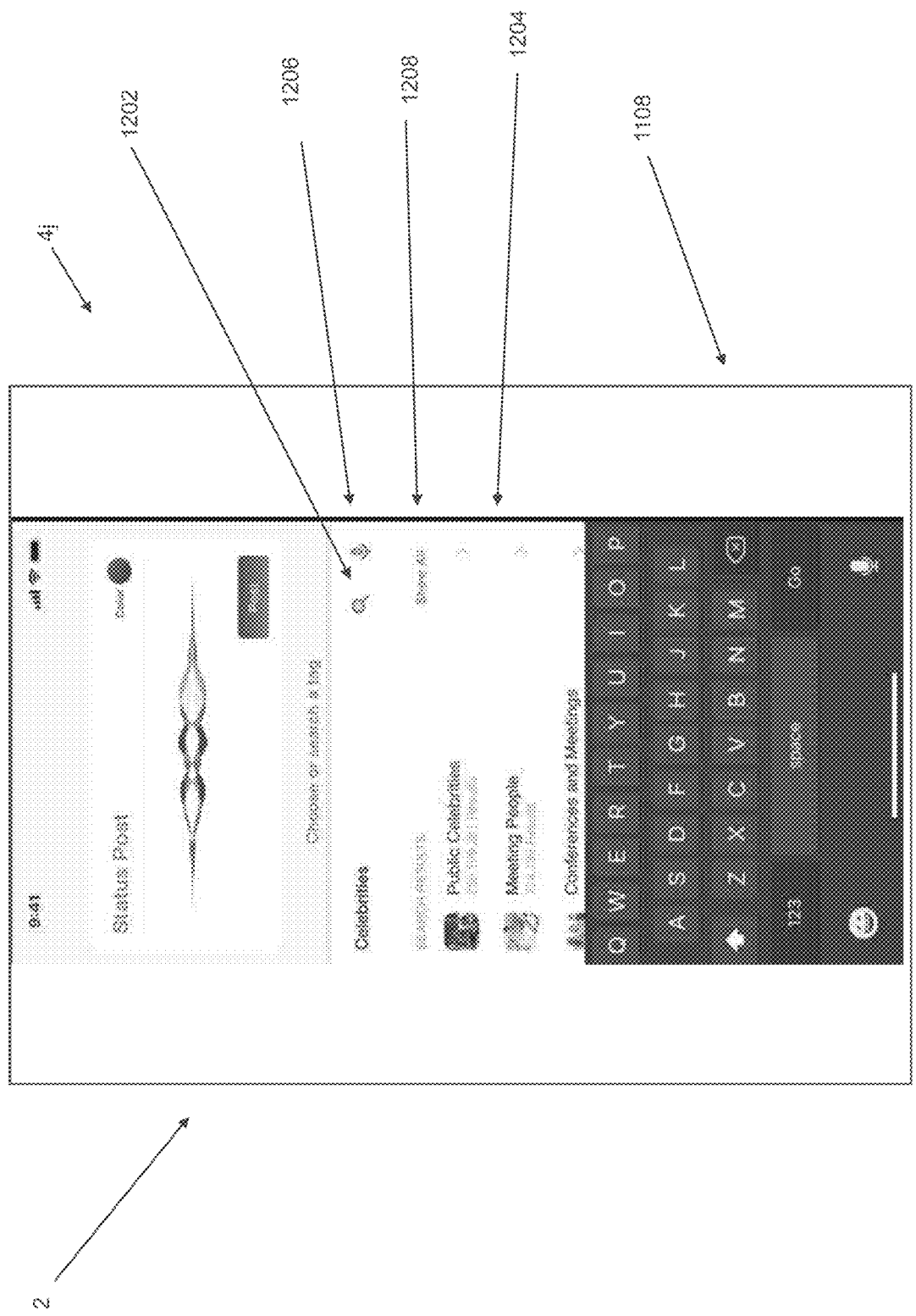
FIG. 13 is another illustration of a feed page which allows the user to select what group or "frequency" that the user can put his/her memos under so that they are in a community that is relevant to the user, constructed according to the present invention.

Regarding FIG. 13, as discussed above with respect to FIG. 12, there are frequencies and tags that are provided to allow the user to upload the user's voice posts into certain niches and groups that the user would like to be a part of when another user searches for that specific frequency/tag. In one embodiment, this grouping of tags and frequencies works by collecting data on every single user that uses a specific tag and places it in these frequency groups where a niche is created. In this manner, a user can find any niche they are searching for or creating memos and content for. This is made by the user and it creates a community. The picture 97*a*-97*f* (FIG. 10) next to the tag/frequency is the most popular creator at the time that is part of that niche and the app 2 is configured to allow for others to be there as well which gives an incentive to make the best content for it as it allows for the homepage 4*i* to be the highlight. The app 2 is configured to once the magnifying glass 1202 (FIG. 13) is clicked, the search bar 1204 is displayed which allows the keyboard 1108 to also be displayed. In this manner, the app 2 is configured to allow the user to enter information into the search bar 1204 through the keyboard 1108 in order to search for something. The user can also use a voice button 1206 to search for a topic as well.

Another unique aspect of the present invention is the way page status post page 4*j* is also a supplication to how app 2 is configured to work in relation to FIG. 12. The grouping is showed and based on the meta results, which means the status post page 4*j* will show the trends or popular frequencies in descending order. There are different frequencies or hashtags by the user selecting certain tags that help differentiate where the user wants his/her post shown under a specific niche. The recommended choices are the most popular at that given time. Those are the trends and are shown to the user first due to their popularity and buzz. The app 2 is configured to allow the show all button 1208 to expand this list and will show in descending order the popular and trending hashtags at that given moment. When the user clicks on a tag/hashtag that the user selected, that tag/hashtag will then be added underneath the user's post. Between the hashtags and the caption, the app 2 is configured to only allow 200 characters so as many as the user can fit within the hashtags and the caption would essentially be the limit.

Figure 14:
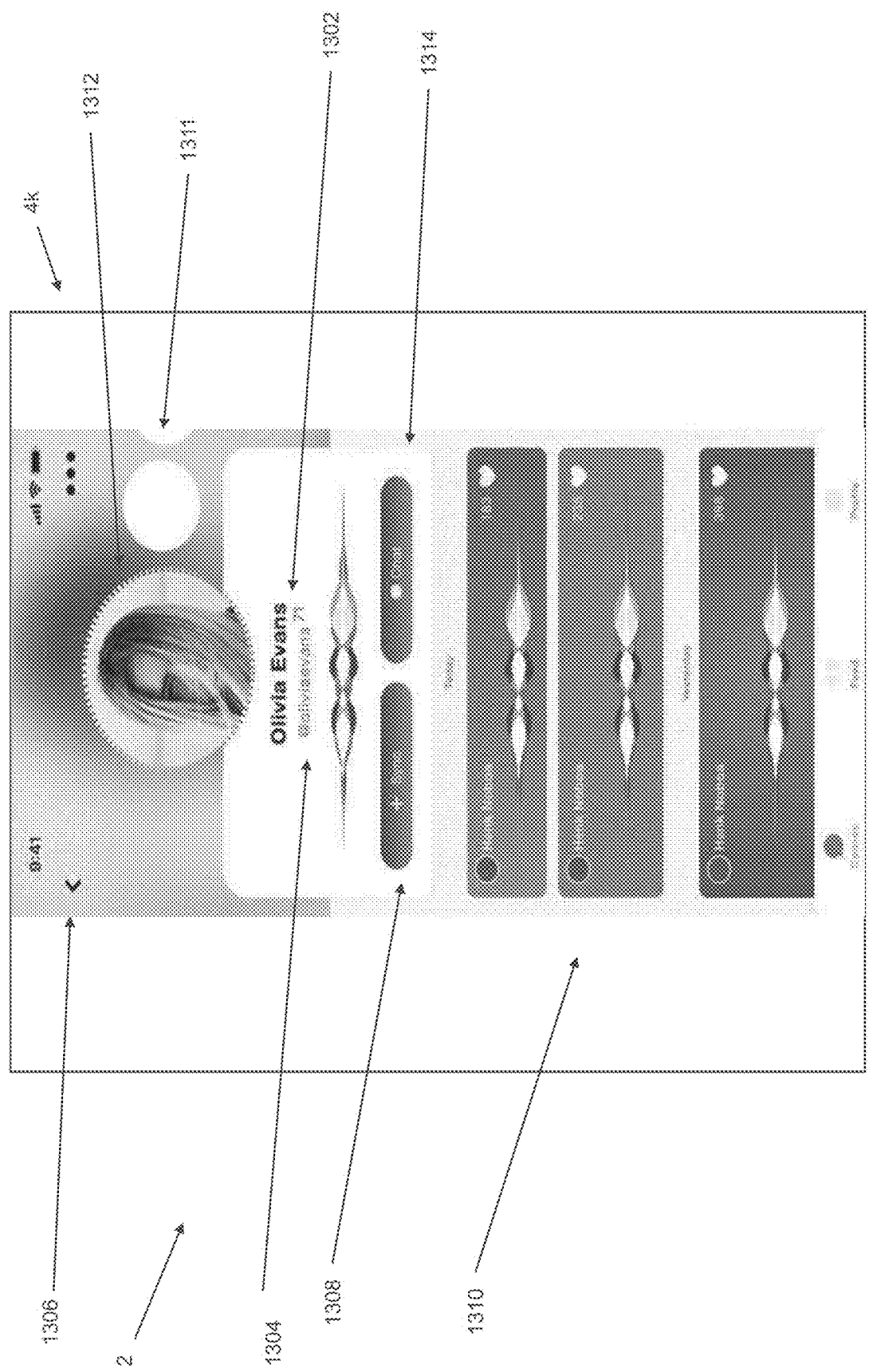
FIG. 14 is an illustration of a feed page which shows how the profile page of another user appears to the user after the user does a search for it, constructed according to the present invention.

Regarding FIG. 14, there is illustrated how the profile page 4*k* of another user appears after a user does a search for it. In particular, this is how the profile page 4*k* looks like when a user finds someone's homepage in the search bar 1204 and clicks on it. The app 2 is then configured to direct the user to that user's profile page 4*k*.

As shown in FIG. 14, the main circle 1312 is that other user's profile picture and the circles 1311 next to the main profile picture 1312 are where that person's main communication goes to which is called the "top 5 wavelengths". The wavelength number 1302 is created by everyone that syncs with the user and the user syncs back with them. So, each person that connects with the user and the user connects back with, the wavelength number 1302 increases which is shown where the @ 1304 is and it is a way users can see how many people they individually connect with. The app 2 is configured to allow the back button 1306 to direct the user back to the search bar 1204 or the homepage 4*i* after clicking the other user's profile on that user's profile page 4*k*.

Upon clicking the sync button 1308, the app 2 is configured to transmit to that user a notification that someone is syncing with them. Upon clicking the chat button 1314, the app 2 is configured to allow for a separate direct message page 4*q* (FIG. 21) that the app 2 directs the user to go to so that the user can then talk to this individual in the chat section of the app 2.

When the user clicks on the voice posts 1310, the app 2 is configured to allow the user to double tap, like, and listen to the other user's voice posts. The app 2 is configured to allow the user to only see the top five (5) wavelengths of other users, once the user is synchronized with them and on one another's wavelength. This allows for an extra layer of protection and security within the app 2. So, if the user is a private account, neither the user's posts nor top 5 are able to be viewed by a new user until the synchronization between the user and the new user happens.

Figure 15:
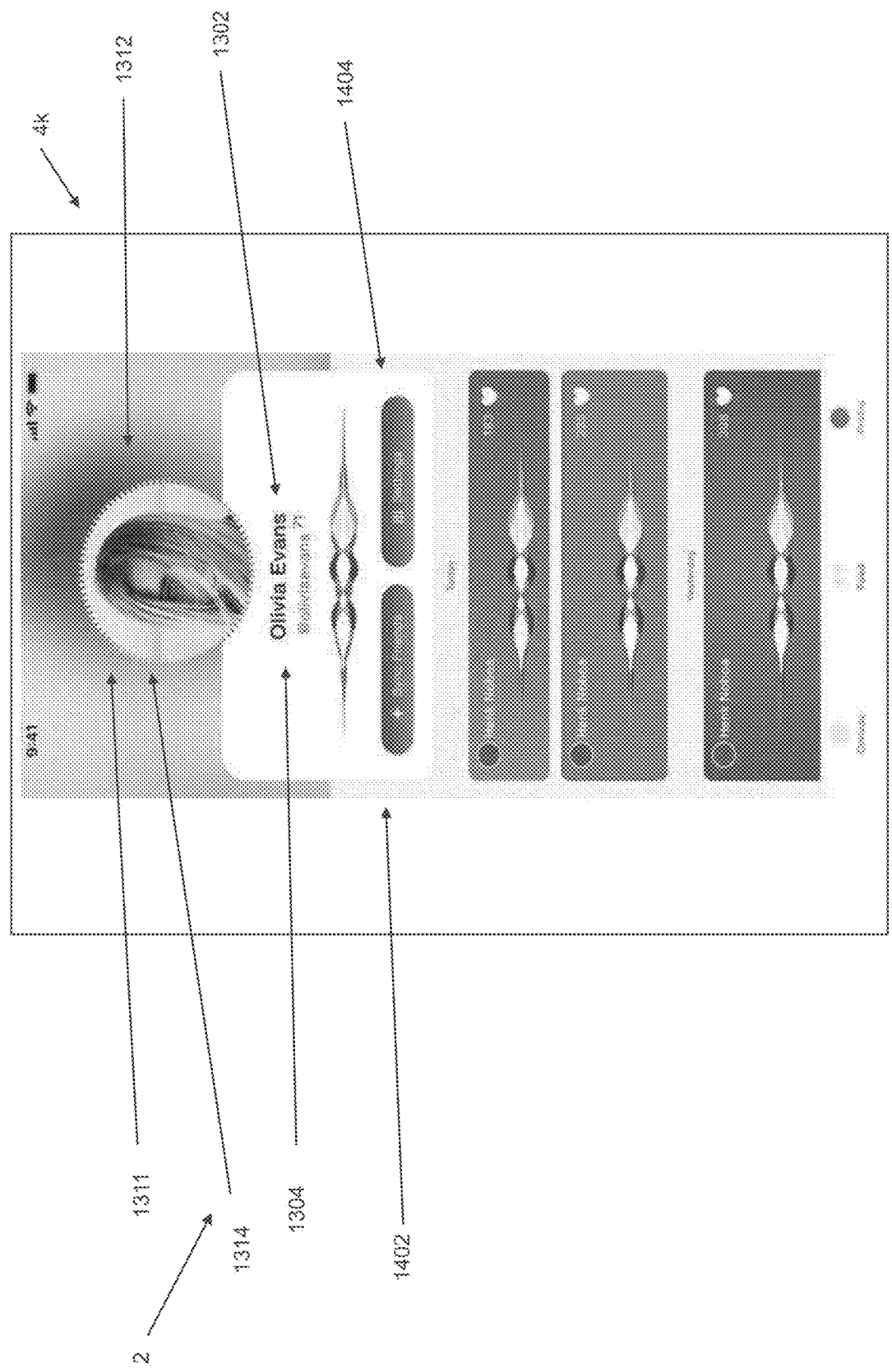
FIG. 15 is an illustration of a feed page which shows how the user's profile page appears to another the user after the other user does a search for it, constructed according to the present invention.
Figure 19:
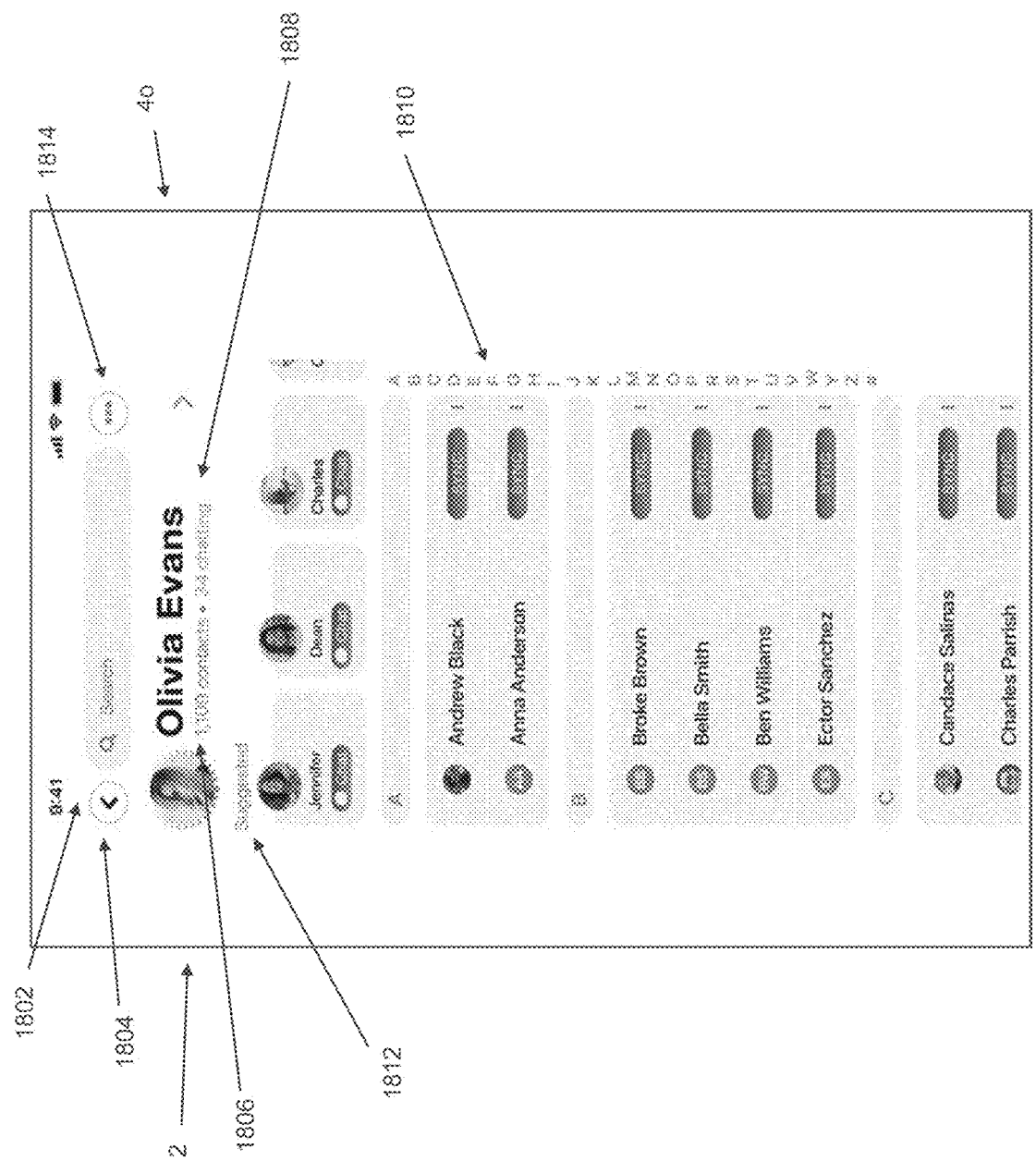
FIG. 19 is an illustration of a feed page which allows the user to add or "sync" contacts, constructed according to the present invention.

With respect to FIG. 15, there is illustrated the user's own profile page 4k and how it looks like when the user sees his/her own page. As shown in FIG. 15, the user's own profile page 4k includes sync friends' button 1402 and a settings button 1404. In particular, the app 2 is configured so that when the user clicks on the sync friends' button 1402, the app 2 directs the user to contacts page 4o (FIG. 19). Furthermore, the app 2 is configured so that when the user hits the sync friends 1402, the user is queried for permissions for the user's contact information so that the app 2 can retrieve the data of other phone numbers in mobile computing device 2465 (i.e., smartphone) that are also users of app 2. This is a similar setup to how the user's profile page 4k (FIG. 14) looks, and the functionality is very similar. The app 2 is also configured so that when the user clicks on the setting button 1404, the app 2 directs the user to the settings page 4l (FIG. 16).

As shown in FIG. 15, the app 2 is configured to display on the user profile page 4k, the users posts and how they are being engaged with by the people that the user is synched with. Furthermore, this user profile page 4k allows the user to see how the user's profile page looks to the other users who find the users @ 1304. In this manner, the user profile page 4k is configured so that the user can view the users own user profile page, listen to the user's voice, view the user's wavelengths, view the user's profile picture 1312, see the user's wavelengths 1311 (FIG. 14), and the amount of people 1302 who have engaged with the users post.

Figure 16:
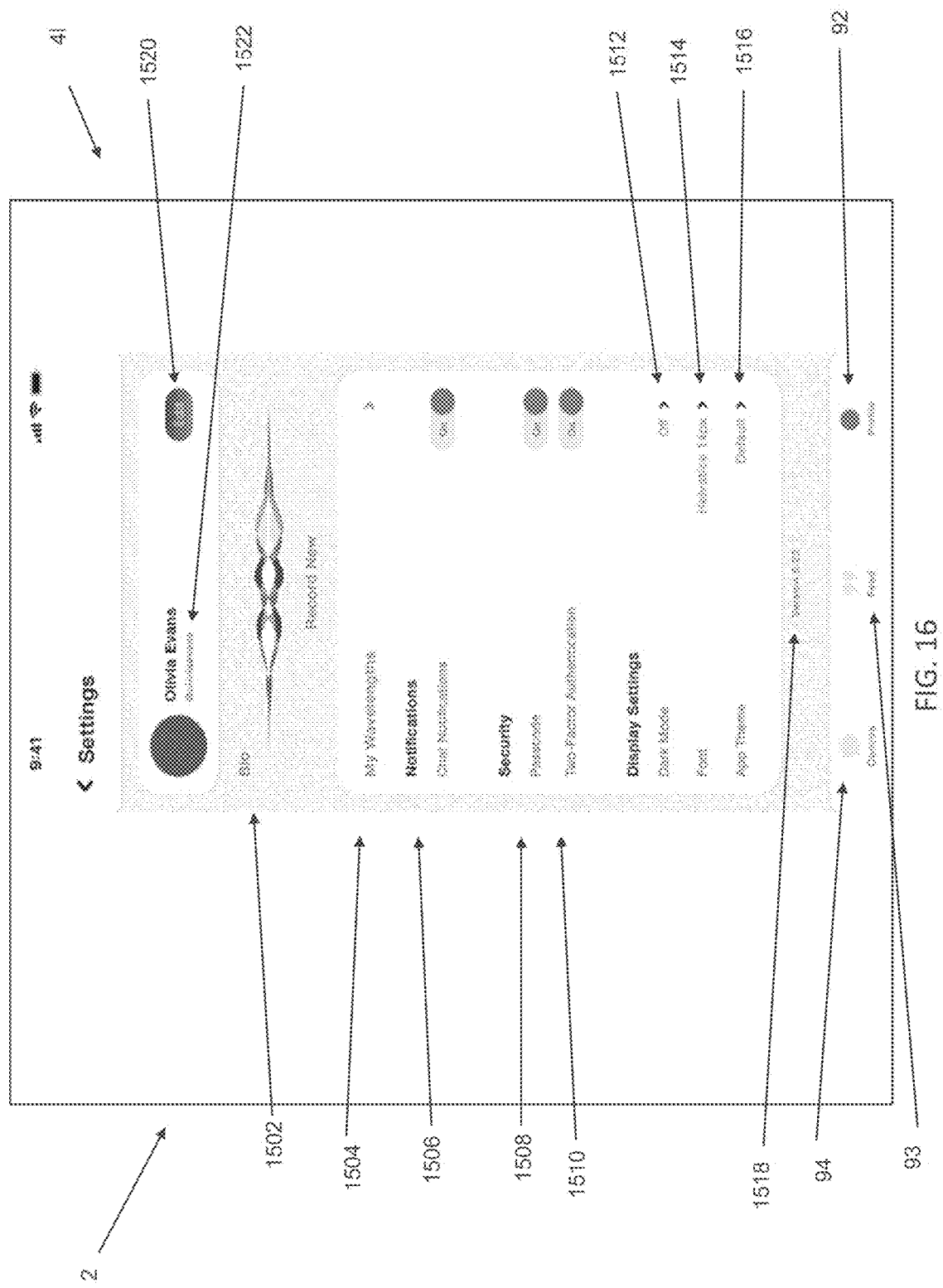
FIG. 16 is an illustration of a feed page which shows the user's settings page, constructed according to the present invention.

With respect to FIG. 16, as discussed above. FIG. 16 illustrates the settings page 4l. In particular, the app 2 is configured so that when the user is directed to the settings page 4l, the settings page 4l is configured to display many options that the user can edit such as like the user's voice bio 1502, wavelengths 1504, chat notifications on or off 1506, passcode 1508, two-factor authentication 1510, dark mode 1512, font 1514, and app themes 1516. The settings page 4l is also configured to show the app version 1518 at the bottom of the settings page 4l. Finally, the settings page 4l is configured to allow the user to move from the conversation tab 94 and the feed tab 93, as well from this page.

A unique aspect of the present invention is that the setting page 4l is configured to allow the user to change different types of user experiences in the app 2. For example, the user can change and check things like the users wavelengths 1504 which is how many people and different users the user is synched with and are synched back with the user. Also, the user is able to go into the edit name 1520 and @ 1522 sections so that the user can change the user's name and @ to something that is not already taken.

The settings page 4l is configured to allow the user to also record a new voice bio from the original setup of the user's account on the app from the record your voice bio page 4g (FIG. 8). As discussed earlier, the record your voice bio page 4g is configured to allow the user to update their voice bio by possibly changing the voice bio and/or talk about something different. As discussed earlier, when the user clicks on the voice bio, the app 2 is configured to allow the user to relisten to what the user has now and reupload a new one if the user chooses to.

The settings page 4l is also configured to allow the user to turn on or off chat notifications 1506. For example, when the user clicks on and toggles the button to the right, the user will get notifications. If the user toggles the button to the left, the user will not get chat notifications.

The settings page 4l is also configured to allow the user to set up a passcode 1508 to allow the user to login to the app 2 if the user chooses to have it to protect the user's voice and to protect the user's account from any potential hacks or breeches of your security. It is to be understood that the user has the ability to add a passcode for the user's protection or the user can choose to not use a passcode to log into the app 2.

The settings page 4l is also configured to allow for two-factor authentication 1510 in order to allow the user to connect to the user's telephone and email so that the user can get messages. In this manner, when the user uses a new device or logs in, the user will be protected. Furthermore, the user can always edit the two-factor authentication by changing it from phone number or email, or both which then allows for an extra layer of protection by sending to the user's telephone or email a security code that the user can enter.

The settings page 4l is also configured to change the display settings. In particular, the settings page 4l is configured to allow the user to toggle between a dark or light mode 1512 of the app 2. As shown in FIG. 16, the settings page 4l is being displayed in light mode since the dark mode is currently selected in the OFF position.

The settings page 4l is configured to allow the user to change the fonts 1514 in the pages of the app 2 to something that the user personally wants which allows for more customization of the app 2. It is to be understood that the app 2 is configured with built in fonts which allow the user to pick from which gives the user more usability and preference.

Figure 18:
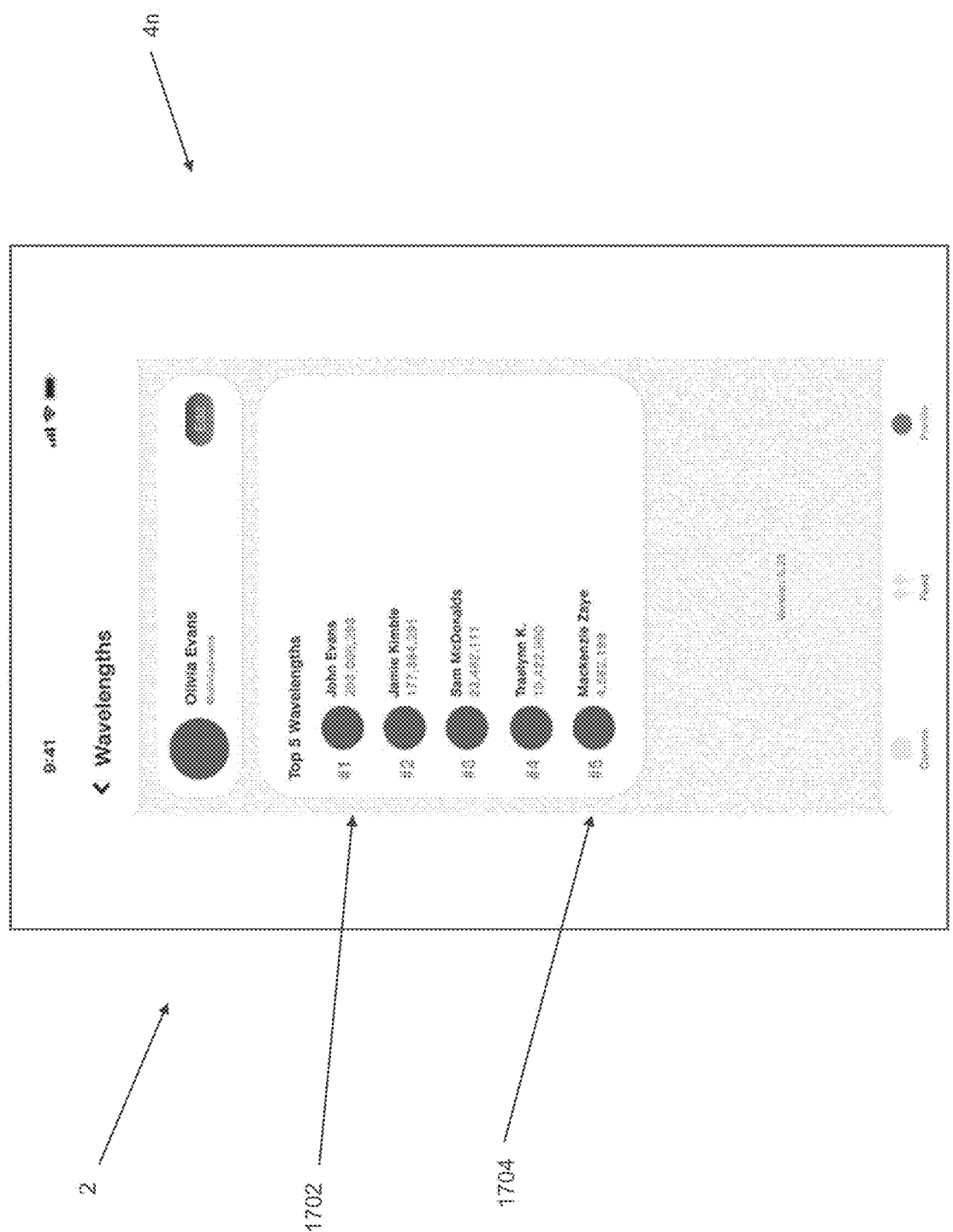
FIG. 18 is an illustration of a feed page which shows how the user's top five (5) wavelengths are presented to the user, constructed according to the present invention.

The settings page 4l is configured to allow the user to see the user's wavelengths through the use of the wavelengths button 1504. Upon clicking on the wavelengths button 1504, the app 2 is configured to direct the user to the wavelengths page 4n (FIG. 18).

The settings page 4l is configured to allow the user to click on the edit button 1520. Upon clicking the edit button 1520, the app 2 is configured to direct the user to the edit profile page 4m (FIG. 17). In particular, when the user clicks on the edit button 1520, the app 2 is configured to allow the user to change the original information entered by the user. It is to be understood that if the user wants to change user information, the app 2 is configured to go back to the original process of going through the same transfer process as the signup process which is when it is received by the server 120 in the readable format, the processor 2302 then decrypts the encrypted folder utilizing AES-256 bit bank grade encryption and the server 120 transfers the information to the database into separate database tables which are then locked. The processor 2302 then encrypts the information into a private key file which is only accessible via the server and the app 2.

The settings page 4i is configured to allow the user to choose dark, light, and other theme options 1516.

Regarding FIG. 17, there is illustrated the edit profile page 4m where the user can edit his/her user profile. In particular, the edit profile page 4m is configured to allow the user to edit the user's profile picture 1602 that the user took originally on the take your photo page 4f (FIG. 7). As discussed above, the app 2 is configured to allow the user to take a picture on the camera 2366 (FIG. 24). A unique aspect of the present invention is that the app 2 is configured to request permission from the user to use the user's camera 2366.

The edit profile page 4m is also configured to allow the user to change information such as things like full name 1604, email 1606, birthday 1608, and phone number 1610. This helps especially if the user does not properly enter any of this information. After the user completes the edits to the user profile, the user then clicks on the save changes button 1612 and the app 2 is configured to save the changes in the database, as discussed earlier.

When the user clicks on the edit button 1520 (FIG. 16), the app 2 is configured to direct the user to the edit profile page 4m so that the user can change the user's profile picture. As discussed above, the profile picture must be taken from the mobile device camera 2366, and not a picture gallery. Furthermore, when the user clicks on the edit button 1520, the app 2 is configured to retrieve that information via the server 120 from the database via encrypted format onto the screen of the edit profile page 4m. The data can then be edited in the edit profile page 4m. When the save button 1612 is clicked, the app2 is configured to send the updated information back to the server 120 in an encrypted format similar to what has been discussed previously.

Regarding FIG. 18, there is illustrated the wavelengths page 4n where the user can view his/her top five (5) wavelengths. The top five (5) wavelengths are decided by how much the user and someone else talk and communicate with one another. The more the user talks to that that person, the more they will be closer to #1 1702. Another unique aspect of the present invention is that the app 2 is configured so that when there is someone who the user talks to more than the current 5$^{th}$ person 1704, that person replaces the current 5$^{th}$ person. Consequently, this list updates and grows every day. The app 2 is configured so that when the "my wavelengths" button 1502 (FIG. 16) is clicked, the app 2 directs the user to wavelengths page 4n. These wavelengths are for people that both sync with one another and are connected.

A unique aspect of the present invention is that it takes seven (7) days to adjust the top 5 with who and how often the user communicates with other users. To join into the top 5, the user has to send memos back and forth more often with certain users than with other users. The more the user interacts with another user, the higher that other user goes on the user's the top 5. It is to be understood that the wavelengths can be private so only a user will be able to see his/her own top 5.

With respect to FIG. 19, there is illustrated a contacts page 4o where the user can "sync" or add contacts. The contacts page 4o is configured to use contacts by the user in order to allow the app 2 to access to their contacts so that the contacts page 4o can display to the user the other users in the user's personal contact list that also have accounts in the app 2 that are linked to those other user's telephone number. In particular, when the user sees these users, the user will be able to sync with people who also have an account that the user has their telephone number in the user's mobile computing device 2465 (i.e., smartphone). If someone does not have an account linked to their number, the user will have the option instead of sync, to invite them and send a SMS to their number to join the app 2.

The app 2 is configured so that when the back button 1804 is clicked, the app 2 is configured to direct the user back to the user profile page 4k (FIG. 14). The app 2 is also configured so that the search bar 1802 allows the user to search for any @ that the user wants to search for on the app 2. The contacts page 4o is configured to show a portion of the user's profile page. The contacts page 4o is also configured to display how many contacts the user has 1806 and how many people are chatting/online/using 1808 the app 2. The names are in alphabetical order 1810 because this makes it easier for the user to find certain friends in the user's phonebook.

The app 2 is configured so that the suggested tab 1812 will show a top three (3) people that are recommended for the user talk to. In this manner, the user can send a personal direct message to those people which is what FIG. 22 looks like. When the user has contacts connected, the app 2 retrieves that information from the user's contacts and that is why the alphabetized contacts exist and the user is able to add the contacts to user's network.

The suggested people are people who the user may know. The app 2 is configured to connect mutual friends and keep track of who the user adds to the contact list and adjusts the suggested list according to who the user is adding. The app 2 is configured to display the keyboard 1108 (FIG. 12) so that the user is able to search for @'s and users through this search bar 1802. It is similar to any search function in the app 2. If there is a contact that does not have access to the app 2, the user can click the invite button (not shown) which will be in place of the sync. This would only be shown if the user shares contact information with the application. This will then allow for the invite to create a link to share-to-messages (SMS) to another individual. The app 2 is configured to display a standard share sheet given the device type (android and iOS) (not shown). If the user only has a contact email, the user can still connect with that other user and the other user's information will get retrieved by the app 2 in the same way.

Figure 20:
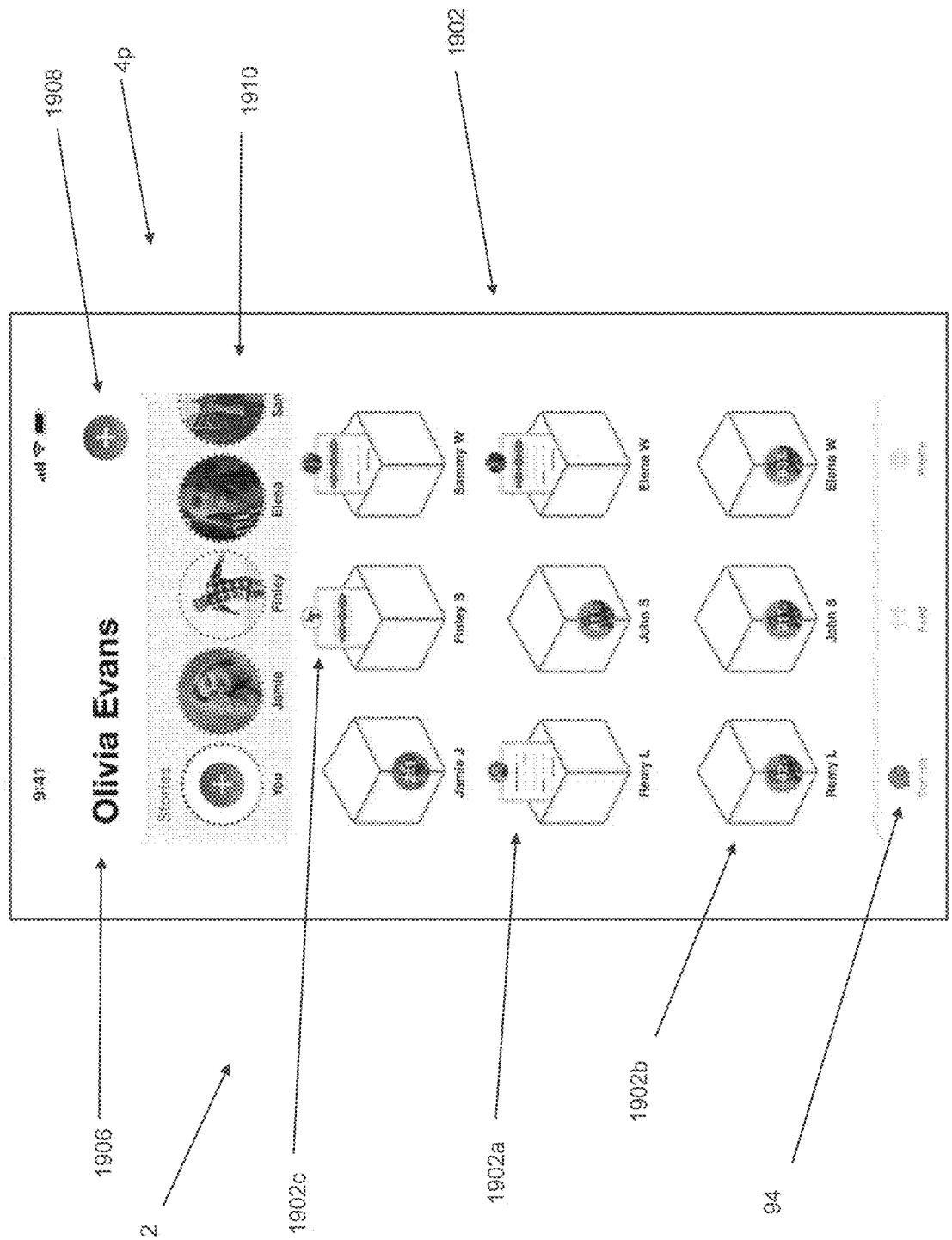
FIG. 20 is an illustration of a feed page which shows voice boxes of other users that have been synched with the user, constructed according to the present invention.

With respect to FIG. 20, there is illustrated a main conversation page 4p. In particular, what makes voice profiles and voice messaging so unique is that they allow for the users of app 2 to communicate using the most natural and human form of communication with one another (i.e., using your own voice). The listener will be able to hear tonality, inflection of voice, and personality which will be specific to the user base and app 2.

In particular, as shown in FIG. 20, main conversation page 4p is configured to display boxes 1902 that are connected to the people that the user talking to, the group chats that the user are in, and the connections the user has through syncing on the app 2, as will be discussed in greater detail later. The top shows the user's name 1906. The app 2 is configured that upon clicking on the +button 1908, the user is able to select, from the user's wavelengths, someone to talk to or create a group chat. Then, underneath it, there are voice stories 1910. The app 2 is configured such that when the user clicks on the voice stories 1910, the user will be able to scroll through different friends uploads to their stories.

Another unique aspect of the present invention is the illustrated nine (9) boxes 1902. It is to be understood that if there are more than nine boxes, the user can scroll down to view the other boxes. The boxes all have different resemblances and meanings. When a box 1902b is closed, it means that the user needs to open up a message. When the box is open, but the voice memo is showing 1902a, that means that someone is currently in the chat and is sending the user something. When the user just sees an opened list and conversation 1902c, that means that the recent message was listened to and is now a conversation at a standstill until another message gets sent.

The main conversation page 4p is the page that the user is directed to by the app 2 when the user clicks on the conversations button 94. The app 2 is configured to allow the user to talk to someone new when the user clicks on the +button 1908. Furthermore, the app 2 is configured to direct the user to viewing stories page 4s (FIG. 24) once the user clicks on the stories button 1910.

Another unique aspect of the present invention is that the conversations are chosen by the user by selecting their wavelength. In this manner, the user is able to choose the people that the user wants to talk to. It is to be understood that the user and the other people talk to one another through end-to-end encryption. Furthermore, the boxes 1902 are ordered in a chronological way, but the app 2 is configured to allow the user to move desired people to the top of the list. Finally, when the user clicks on one of the boxes 1902, the app 2 is configured to direct the user to the individual chat page 4q (FIG. 21).

Figure 21:
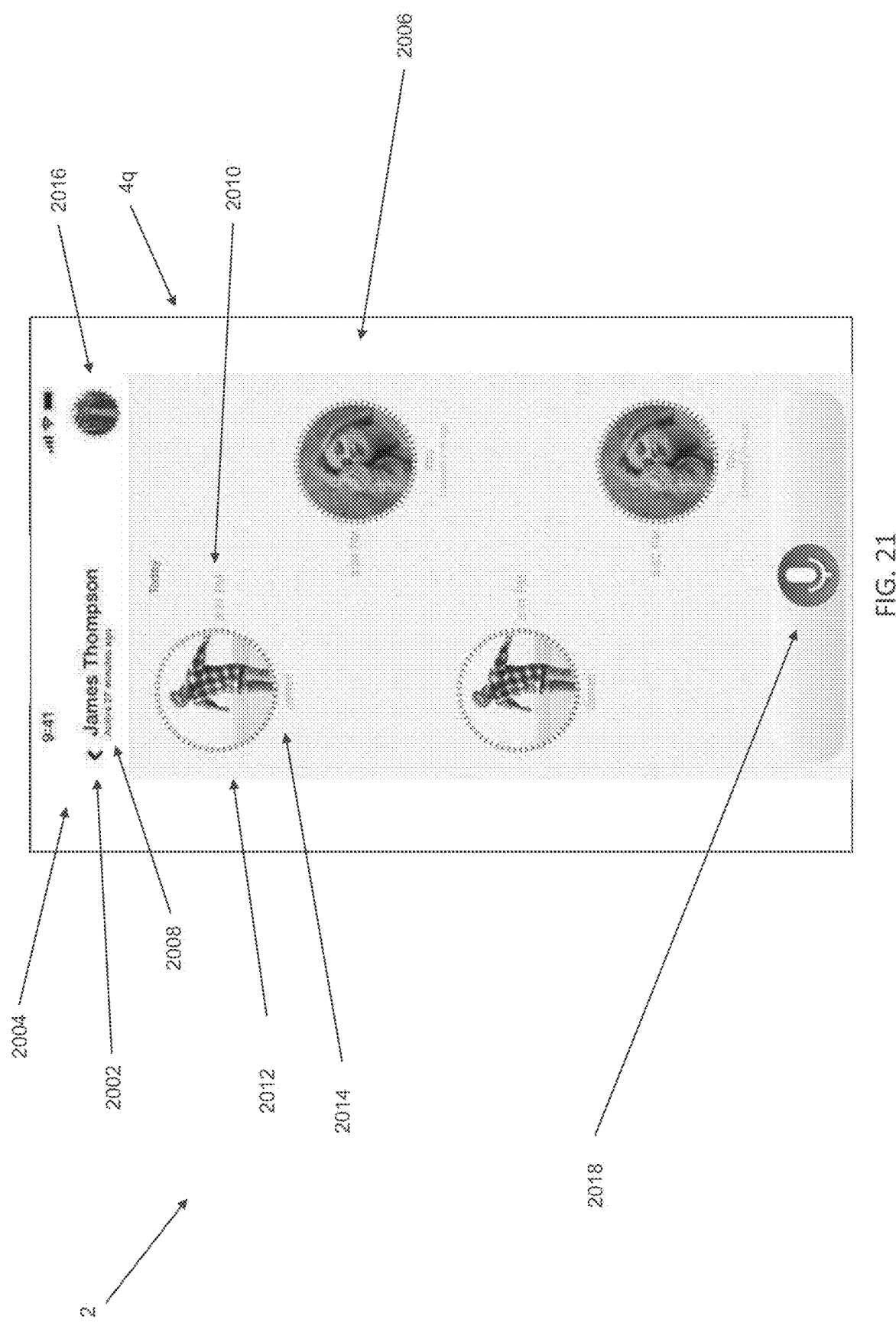
FIG. 21 is an illustration of a chat dialogue where the user and the person he/she is talking to will have his/her profile pictures surrounded by illuminating rings that disappear in a clockwise manner around the message depending on the duration of the voice memo, constructed according to the present invention.

With respect to FIG. 21, FIG. 21 illustrates individual chat page 4q. In particular, the app 2 is configured to direct the user to the individual chat page 4q when the user opens a box 1902 (FIG. 20). The individual chat page 4q is configured to allow the user to click and listen to another user's message. The page is configured to direct the user back to the contacts page 4o (FIG. 19) once the user clicks on the arrow 2002. In this manner, the clicking on arrow 2002 will direct the user back to the initial conversations tab 94 that is located on the bottom left of the pages. The name 2004 designates the person that the user is talking to currently. The picture 2006 is the profile picture of the person the user is talking to. Underneath their name 2008 shows how recent someone has been active and using the app 2. Next to their profile picture in the chat section, the time 2010 that the message was sent to the user is displayed.

When the user clicks on the profile picture 2006 of the person that the user is talking to, the app 2 is configured to start playing the voice memo from that person. The marks 2012 located around the profile picture designate how long the memo is. Underneath the profile picture is the other user's first name 2014 so that the user will aways know who the user is talking to. When in a group chat, this will assist in differentiating who is talking and sending messages.

When the user presses the record button 1814 (FIG. 19), the app 2 is configured to allow the user to then record a message and send a message. The individual chat page 4q illustrates how it looks when the user is communicating with someone. Furthermore, the individual chat page 4q is where the user is talking to the people that the user synched with and synched back with the user. This individual chat page 4q is where the user is synched in group chats. When the user clicks on the top right picture 2016, the app 2 is configured to direct the user to the user's profile page 4k. (FIG. 14). Upon clicking the microphone button 2018, the app 2 is configured to allow the user to start recording a voice memo to send to the person the user is talking to or the group the user is, as discussed previously. It is to be understood that this individual chat page 4q is the area where the private conversations are happening and there is end-to-end encryption. When the user is talking to someone, the user and the other user are sending voice notes back and forth.

It is to be understood that the individual chat page 4q may be configured to allow the user to see when a voice note was listened to. In this manner, the user will know when another user has listened to the user's message/voice memo. Also, the individual chat page 4q could be configured to include a circle (not shown) for the profile picture 2016 which can be a video. Also, the individual chat page 4q could be configured to allow the user to see the last time another user sent and used the app 2 to send messages.

Figure 22:
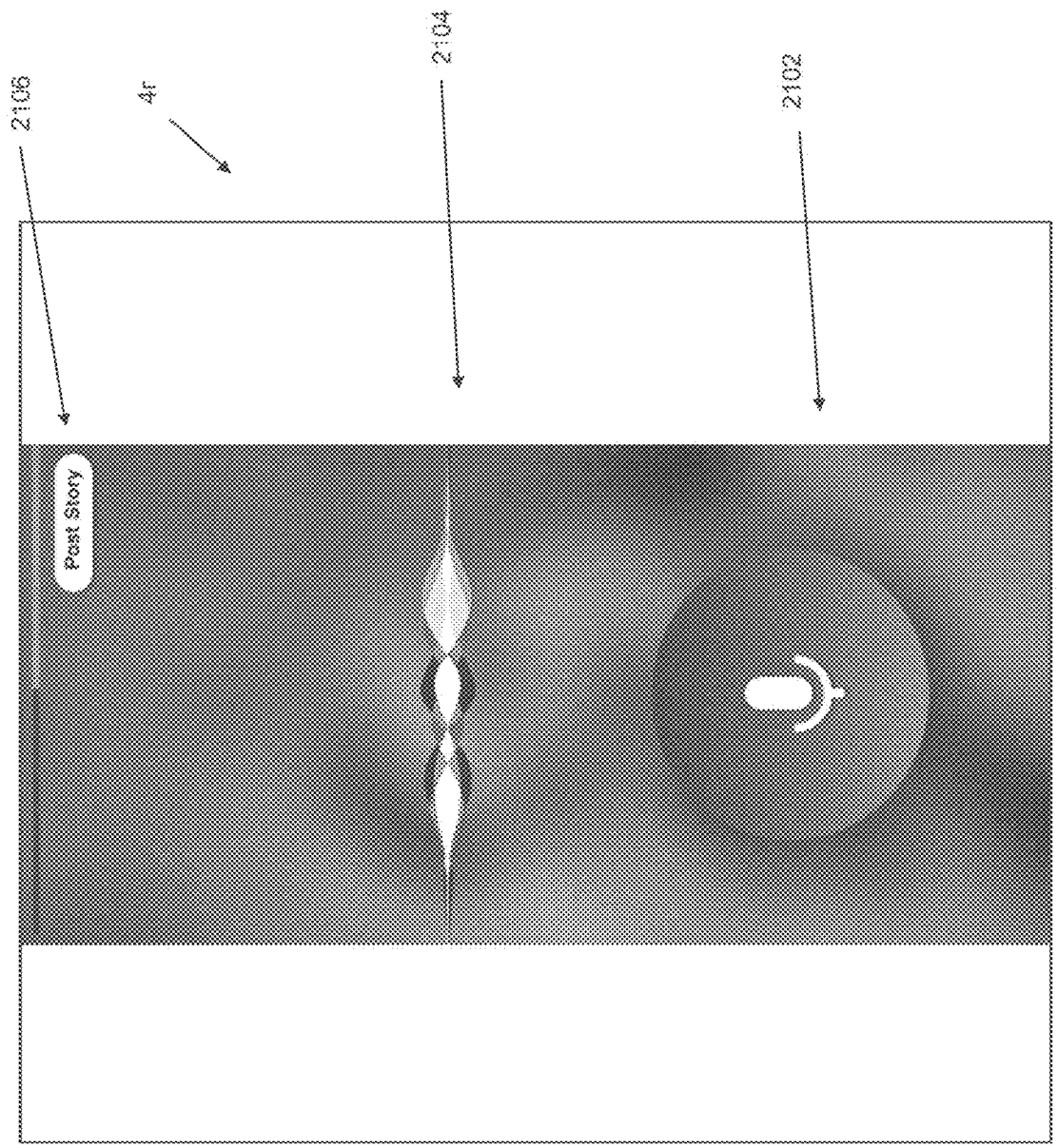
FIG. 22 is an illustration of a feed page that allows the user to record a voice story by holding down the microphone button while talking and then posting the story on his/her user profile, constructed according to the present invention.

Regarding FIG. 22, there is illustrated a record story page 4r. The app 2 is configured to direct the user to the record story page 4r once the user clicks on the stories button 1910 (FIG. 20). In this manner, the user will be allowed to start recording a personal voice story for the other users to listen to who are synched to the user. The app 2 is configured to allow the user to use the microphone 2102 to record a new message. In particular, when the user clicks on the microphone button 2102, the app 2 is configured to interact with the microphone 2467 to allow the user to record a new message/story. When the user records the user's own story, the app 2 is configured to allow the user to delete and redo the story until the user is satisfied with the story. The user can listen to the user's story by clicking the voice blurb 2104. The app 2 is configured to retrieve the user's voice story from the server 120 and forward the user's story to app 2 so that the user can listen to the story. Once the user is satisfied with the story, the app 2 is configured to allow the user to click the post story button 2106 so that the story will be posted on the individual chat page 4q (FIG. 21). It is to be understood that stories are basically what goes to the user's wavelengths and more personal connections so that there is a different thing the user talks about with people who are closer to the user's inner circle.

Figure 23:
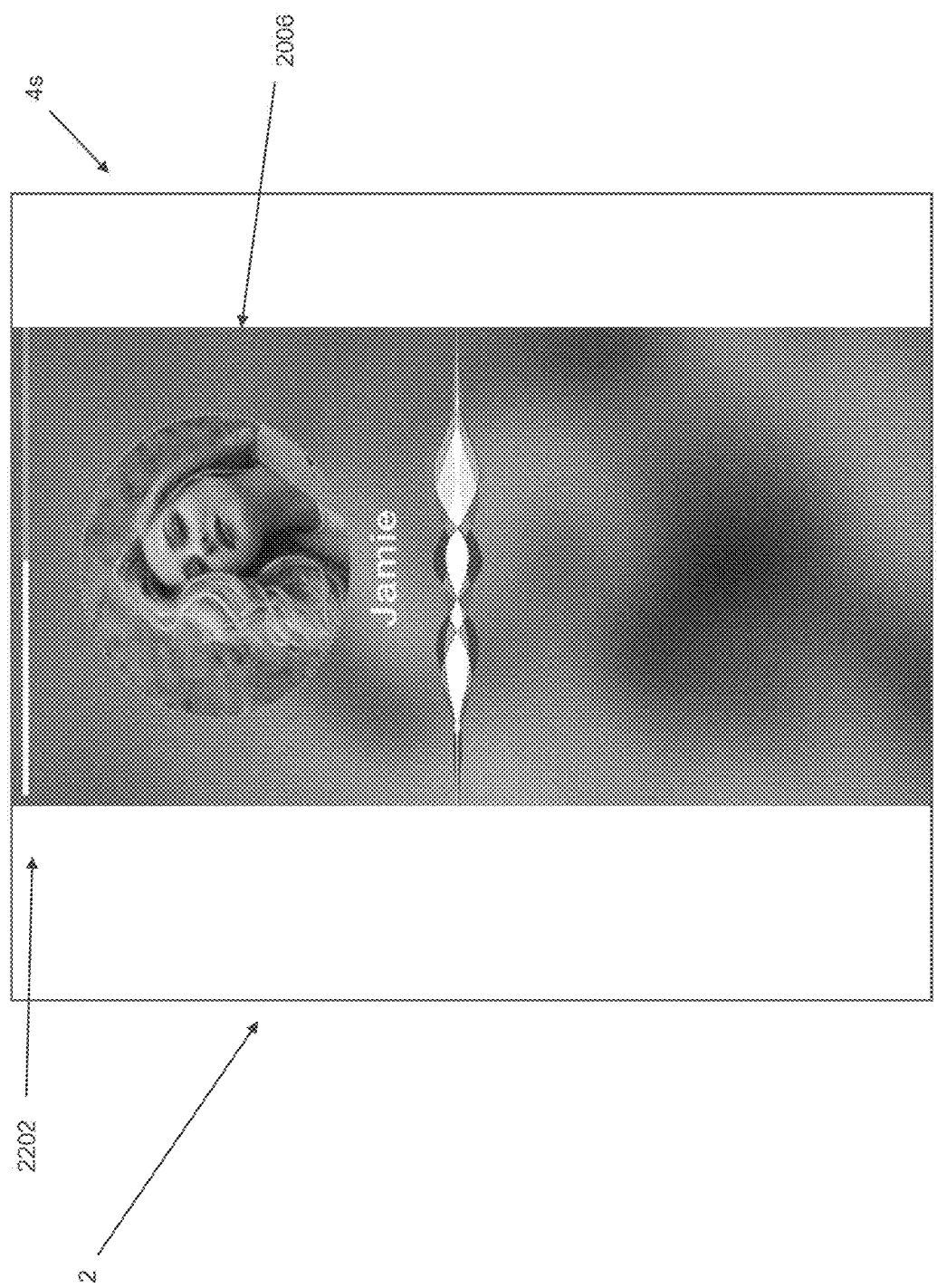
FIG. 23 is an illustration of a feed page that shows what a user's story looks like when being viewed by another user, constructed according to the present invention.

With respect to FIG. 23, there is illustrated a viewing stories page 4s. The app 2 is configured to direct the user to this page once the user clicks on a profile picture 2006 (FIG. 21) of the people that the user is synched with. The app 2 is then configured to initiate playing of the audio message/note associated with that other user's profile picture as the backdrop. This happens due to the user clicking on one of the circles in the stories button 1910 (FIG. 20). When the user listens through the other user's story post, the story will play automatically or when the user clicks next to that other user in the story button 1910.

The app 2 is configured so that when the user clicks on listen to stories every time, a new person appears on the screen and a new audio file is also played according to what they recorded. The bar 2202 shows how many different stories from this other user are available for the user to listen to and have to click through before the next user pops up. As previously discussed, the app 2 is configured such that if the user clicks on the user's profile picture 2006, the user will be directed to that other user's profile. This will allow the user to move throughout the app 2 fluidly. Furthermore, the app 2 is configured to allow the user to click on the stories button 1910 and the stories will be presented to the user in chronological order. This chronological order will allow for the app 2 to move more in real time and authentically. It is to be understood that if the user does not synchronize (follow) with the person, then the user cannot see the story if the other user is a private account.

It is to be understood that future updates or modifications to the system 100 for supporting a social media application platform that utilizes the exchange of voice messages could include, but are not limited to the following:

1) Video chat and audio call features.
   a. Users will have the ability to directly open a call with another user by integrating video chat video and audio call features within the application platform. The option to do this will appear in direct message (DM) conversations. The user can do this by tapping the video camera option to select video chat, or the phone call button to open an audio call at the top of FIG. 21. Specifically, there will be options between the name 2004 and the profile picture 2016. The two options to tap or click will be a phone for audio calls only, or a video camera for video camera chat using the front and rear cameras of the device.
2) Public soundboard, private direct messaging,
   a. In future updates, the platform will be able to have private and public accounts and decisions to make those choices based on what the user wants.
   b. The conversations tab is only accessible with people when they synchronize with one another.
3) Comment section.
   a. This will be a Pay2Comment (forever service) that provides users with the ability to comment with text underneath posts, both their own posts, as well as other posts. The default account must pay to enable the ability to comment. This implies that a fresh user account that does not pay for this feature will not have the ability to respond underneath a post or comment. This will eliminate spam and will eliminate bots and the hacker services.
4) Title for posts; limited words.
   a. In a future update, users will have the ability to use text or add a small title on their posts (refer to FIG. 10) to provide textual description for their post which can be seen before even listening to the post. This is a feature that makes the application easier to navigate for the user, to see if they want to listen to that post at that moment, which effectively increases the ease of use of the platform.
5) Adding multiple languages to the platform.
   a. The application will have the option to change languages from the default language which will be English, to languages such as but not limited to Arabic, Spanish, Portuguese, Indonesian, Malaysian, Punjabi, Hindi, Italian, French, Mandarin, Turkish, German, among others. Users will also be able to use their integrated language keyboards that they select and add from their device settings.
6) A subscribe section for people to make premium content.
   a. To even have this you must pay a minimum amount (i.e., 10 dollars a month).
   b. If someone wants to post 10-15 min audio files and upload them, they will have to have a business account, or a podcast account to be able to do such. This will allow people to use this platform for marketing and promotion on a platform that already allows for the user to be ready to listen.
7) A go live feature in which users can go on livestream.
   a. This will be a service in where you as the user can go on a livestream to share with users live and in the moment content.
8) Other users can watch a livestream to watch or listen to their friends or other content creators.
   a. Users can send and receive gifts and donations in livestreams through microtransactions within the platform. All users can send donations to other users who are livestreaming. To accept and receive payments, users must unlock the feature to accept and receive gifts which will require a subscription service that costs a minimum amount (i.e., 10 dollars a month).
9) Birthday notifications.
   a. During signup, users will be required to enter their birthday information in order to authenticate their age. Users who are using the platform will receive notifications of when it is their friends' or contacts' birthdays. This will allow for users to be up to date with their friend's birthdays!
10) VoizeMeal.
    a. A service business' will use to receive payments and for customers to order with their voice and talk about where they're at and pay for their food all in one. Also, it would be a way for drivers to easily communicate with the customer.
    b. This would also allow for the user/person ordering to give a simple specific instruction like "hey could you ask them for an extra ranch?" This would allow for ease for both people and better incentives for tips and services. Leave a VoizeMeal! It will also allow for restaurants to not get clogged up behind delivery/pickup orders because the orders come in as individual calls/orders. No more calling a restaurant and they're currently on the phone with someone else so you don't spend your money there. This is a potential service that the platform could evolve to and allow for businesses to make profitable moves through the application's infrastructure.
11) Human Verification.
    a. Users will have the option to receive a verified human checkmark beside their username, wherever their username appears on the app. This can be done if users upload additional information to the platform, such as a driver's license or passport, or other form of ID.
    b. This also can be done with student I.D.'s, potential reCAPTCHA, and having different ways to make sure that artificial intelligence does not manipulate or play a part in taking users data or acting as someone else due to what is available nowadays with the infrastructure of the internet.
12) Theme Customizations and Designs on the chat boxes
    a. The theme customizations will allow for the application to be personalized for the user through the settings and there will be theme customizations in the future in where companies, brands, and influencers can create to monetize their likeness and individuality.
    b. The chat boxes will be able to be edited and manipulated for the user's personalization as well. These will be done by being sold for microtransactions on the platform or from the application platform website.
    c. The customization can happen and relationships can be made from companies, brands, and designers to create designs for the application platform boxes in order to further brand themselves. The user can also personalize it in where they can buy a design for their box from creators, brands, and companies they support.
    d. Examples of customization can be, but not are limited to, the following; a gift box, a pumpkin, a birthday cake, a popular video game item, a popular skate brands logo, and a popular consumables colors and branding.
13) VoiceVault
    a. This will be a section in where the user can save the user's favorite memos and share them with other users in the user's group chats or individual chats.
    b. This will act as a place to have "sound memes" or some of your favorite audio memories.

14) Audio transcription within direct messages and Soundboard
   a. Voice memo transcription would be a future update for ease of use and allow for people who are hard of hearing to still use the platform efficiently
   b. The voice transcription within the soundboard would be added within the soundboards posts and can be turned on or off through the settings.
   c. The voice transcription within the direct messages can also be turned on or off through the settings as well.
   d. The ease of use would be increased and would allow for more people to enjoy the platform.
   e. It would be part of the message and the user can hear the audio and follow along with the words being spoken and read along which will allow for a better listen and read at the same time.
   f. This will evolve to multiple languages in future updates as well.

Computing Device Embodiment

FIG. 24 illustrates an example computing device that is configured and/or programmed as a special purpose computing device with one or more of the example systems and methods described herein, and/or equivalents. The example computing device may be a computer 2400 that includes at least one hardware processor 2402, a memory 2404, and input/output ports 2410 operably connected by a bus 2408. In one example, the computer 2400 may include logic 2430 configured to facilitate the exchanging of voice messages and methods shown in FIGS. 2-23.

In different examples, the logic 2430 may be implemented in hardware, a non-transitory computer-readable medium 2437 with stored instructions, firmware, and/or combinations thereof. While the logic 2430 is illustrated as a hardware component attached to the bus 2408, it is to be appreciated that in other embodiments, the logic 2430 could be implemented in the processor 2402, stored in memory 2404, or stored in disk 2406.

In one embodiment, logic 2430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the exchanging of voice messages and methods shown in FIGS. 2-23. The means may also be implemented as stored computer executable instructions that are presented to computer 2400 as data 2416 that are temporarily stored in memory 2404 and then executed by processor 2402.

Logic 2430 may also provide means (e.g., hardware, non-transitory computer-readable medium that stores executable instructions, firmware) for performing the exchanging of voice messages.

Generally describing an example configuration of the computer 2400, the processor 2402 may be a variety of various processors including dual microprocessor and other multi-processor architectures. A memory 2404 may include volatile memory and/or non-volatile memory. Non-volatile memory may include, for example, ROM, PROM, and so on. Volatile memory may include, for example, RAM, SRAM, DRAM, and so on.

A storage disk 2406 may be operably connected to the computer 2400 via, for example, an input/output (I/O) interface (e.g., card, device) 2418 and an input/output port 2410 that are controlled by at least an input/output (I/O) controller 2440. The disk 2406 may be, for example, a magnetic disk drive, a solid-state disk drive, a floppy disk drive, a tape drive, a Zip drive, a flash memory card, a memory stick, and so on. Furthermore, the disk 2406 may be a CD-ROM drive, a CD-R drive, a CD-RW drive, a DVD ROM, and so on. The memory 2404 can store a process 2414 and/or a data 2416, for example. The disk 2406 and/or the memory 2404 can store an operating system that controls and allocates resources of the computer 2400.

The computer 2400 may interact with, control, and/or be controlled by input/output (I/O) devices via the input/output (I/O) controller 2440, the I/O interfaces 2418, and the input/output ports 2410. Input/output devices may include, for example, one or more displays 2470, printers 2472 (such as inkjet, laser, or 3D printers), audio output devices 2474 (such as speakers or headphones), text input devices 2480 (such as keyboards), cursor control devices 2482 for pointing and selection inputs (such as mice, trackballs, touch screens, joysticks, pointing sticks, electronic styluses, electronic pen tablets), audio input devices 2484 (such as microphones or external audio players), video input devices 2486 (such as video and still cameras, or external video players), image scanners 2488, video cards (not shown), disks 2406, network devices 2420, and so on. The input/output ports 2410 may include, for example, serial ports, parallel ports, and USB ports.

The computer 2400 can operate in a network environment and thus may be connected to the network devices 2420 via the I/O interfaces 2418, and/or the I/O ports 2410. Through the network devices 2420, the computer 2400 may interact with a network 2460. Through the network, the computer 2400 may be logically connected to remote computers 2465. Networks with which the computer 2400 may interact include, but are not limited to, a LAN, a WAN, and other networks.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

All of the features disclosed in this specification may be combined in any combination. Thus, unless expressly stated otherwise, each feature disclosed is only an example of a generic series of equivalent or similar features.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other modifications and implementations will occur to those skilled in the art without departing from the spirit and the scope of the invention. Accordingly, the description hereinabove is not intended to limit the invention.

Therefore, provided herein is a new and improved social media application platform (app), which according to various embodiments of the present invention, offers the following advantages: ease of use; the ability to communicate with another member of the social media application platform based solely on the exchange of voice messages; the ability to sync with (add contacts) other people with whom the user wants to communicate with; the ability to display the profiles of the synced members; the ability to communicate with the synced members through a native language; and the ability to create a voice profile of each of the synced members.

In fact, in many of the preferred embodiments, these advantages of ease of use, the ability to communicate with another member of the social media application platform based solely on the exchange of voice messages, the ability to sync with (add contacts) other people with whom the user wants to communicate with, the ability to display the profiles of the synced members, the ability to communicate with the synced members through a native language, and the ability to create a voice profile of each of the synced members are optimized to an extent that is considerably higher than heretofore achieved in prior, known social media application platforms (apps).

What is claimed is:

1. A method performed by a computing system comprising at least one processor, the method comprising:
   receiving a first audio signal that is based upon speech uttered by a first user and captured by one or more microphones located on a device associated with the first user;
   processing the first audio signal to create a voice biography of the first user;
   receiving a first video signal that is based upon an image of the first user and captured by a camera located on the first user's device;
   processing the first video signal to create a profile picture of the first user;
   storing the voice biography of the first user and the profile picture of the first user;
   retrieving the voice biography of the first user and the profile picture of the first user;
   displaying the voice biography of the first user and the profile picture of the first user on the first user's device;
   receiving other audio signals that are based upon speech uttered by a plurality of other users and captured by one or more microphones located on devices associated with each of the plurality of other users;
   processing the other audio signals to create a voice biography of each of the plurality of other users;
   receiving other video signals that are based upon images of the plurality of other users and captured by a camera located on the devices associated with each of the plurality of other users;
   processing the other video signals to create a profile picture of each of the plurality of other users;
   storing the voice biography of each of the plurality of other users and the profile picture of each of the plurality of other users;
   retrieving the voice biography of at least one of the plurality of other users and the profile picture of the at least one of the plurality of other users;

displaying the voice biography of the at least one of the plurality of other users and the profile picture of the at least one of the plurality of other users on the first user's device;

configuring the first user's device to play the voice biography of the least one of the plurality of other users upon the first user selecting the voice biography of the at least one of the plurality of other users;

upon determining, by the first user, that the first user wants to communicate with the at least one of the plurality of other users, synchronizing the first user with the at least one of the plurality of other users in order that the first user and the at least one of the plurality of other users can communicate with each other through the first user's device and the device associated with the at least one of the plurality of other users;

retrieving voice biographies of a group of the plurality of other users and profile pictures of the group of the plurality of other users;

displaying the voice biographies of the group of the plurality of other users and the profile pictures of the group of the plurality of other users on the first user's device;

configuring the first user's device to play the voice biography of each member of the group of the plurality of other users upon the first user selecting the voice biography of each member of the group of the plurality of other users; and upon determining, by the first user, that the first user wants to communicate with each member of the group of the plurality of other users, synchronizing the first user with each member of the group of the plurality of other users in order that the first user and each member of the group of the plurality of other users can communicate with each other through the first user's device and the device associated with each member of the group of the plurality of other users.

2. The method of claim 1, wherein processing the first audio signal to create a voice biography of the first user further comprises:
encrypting the first audio signal.

3. The method of claim 1, wherein method further comprises:
modifying, by the user, the voice biography of the first user to add a tag or a hashtag to the voice biography of the first user.

4. The method of claim 1, wherein the method further comprises:
determining an amount of time that the first user communicates with each member of the group of the plurality of other users;
preparing a listing of each member of the group of the plurality of other users based upon the amount of time that the first user communicates with that member of the group of the plurality of other users; and
configuring the first user's device to display the listing on the first user's device.

5. The method of claim 1, wherein the method further comprises:
receiving information related to each of the members of the group of the plurality of other users, wherein the information includes names, telephone numbers, and e-mail addresses of each of the members of the group of the plurality of other users;
processing the received information related to each of the members of the group of the plurality of other users to create an address listing of each of the members of the group of the plurality of other users; and
configuring the first user's device to display the address listing of each of the members of the group of the plurality of other users on the first user's device.

6. The method of claim 1, wherein the method further comprises;
monitoring communications between the first user and each member of the group of the plurality of other users;
determining if the first user and each member of the group of the plurality of other users are actively communicating;
determining if the first user and each member of the group of the plurality of other users are not actively communicating;
determining if the first user has communicated with a member of the group of the plurality of other users and the member of the group of the plurality of other users has not communicated back to the first user;
creating an array of objects, wherein each of the array of objects is configured to show one of the following;
if the first user and each member of the group of the plurality of other users are actively communicating,
if the first user and each member of the group of the plurality of other users are not actively communicating, or
if the first user has communicated with a member of the group of the plurality of other users and the member of the group of the plurality of other users has not communicated back to the first user; and
configuring the first user's device to display the array of objects on the first user's device.

7. A non-transitory computer-readable medium that includes stored thereon computer-executable instructions that when executed by at least a processor of a computer cause the computer to:
receive a first audio signal that is based upon speech uttered by a first user and captured by one or more microphones located on a device associated with the first user;
process the first audio signal to create a voice biography of the first user;
receive a first video signal that is based upon an image of the first user and captured by a camera located on the first user's device;
process the first video signal to create a profile picture of the first user;
store the voice biography of the first user and the profile picture of the first user;
retrieve the voice biography of the first user and the profile picture of the first user;
display the voice biography of the first user and the profile picture of the first user on the first user's device;
receive other audio signals that are based upon speech uttered by a plurality of other users and captured by one or more microphones located on devices associated with each of the plurality of other users;
process the other audio signals to create a voice biography of each of the plurality of other users;
receive other video signals that are based upon images of the plurality of other users and captured by a camera located on the devices associated with each of the plurality of other users;
process the other video signals to create a profile picture of each of the plurality of other users;

store the voice biography of each of the plurality of other users and the profile picture of each of the plurality of other users;
retrieve the voice biography of at least one of the plurality of other users and the profile picture of the at least one of the plurality of other users;
display the voice biography of the at least one of the plurality of other users and the profile picture of the at least one of the plurality of other users on the first user's device;
configure the first user's device to play the voice biography of the least one of the plurality of other users upon the first user selecting the voice biography of the at least one of the plurality of other users;
upon determining, by the first user, that the first user wants to communicate with the at least one of the plurality of other users, synchronizing the first user with the at least one of the plurality of other users in order that the first user and the at least one of the plurality of other users can communicate with each other through the first user's device and the device associated with the at least one of the plurality of other users;
retrieve voice biographies of a group of the plurality of other users and profile pictures of the group of the plurality of other users;
display the voice biographies of the group of the plurality of other users and the profile pictures of the group of the plurality of other users on the first user's device;
configure the first user's device to play the voice biography of each member of the group of the plurality of other users upon the first user selecting the voice biography of each member of the group of the plurality of other users; and
upon determining, by the first user, that the first user wants to communicate with each member of the group of the plurality of other users, synchronizing the first user with each member of the group of the plurality of other users in order that the first user and each member of the group of the plurality of other users can communicate with each other through the first user's device and the device associated with each member of the group of the plurality of other users.

8. The non-transitory computer-readable medium of claim 7, wherein the instructions to process the first audio signal to create a voice biography of the first user further comprising instructions that, when executed by at least the processor, cause the processor to:
encrypt the first audio signal.

9. The non-transitory computer-readable medium of claim 7, further comprising instructions that, when executed by at least the processor, cause the processor to:
configure the first user's device to allow the user to modify the voice biography of the first user to add a tag or a hashtag to the voice biography of the first user.

10. The non-transitory computer-readable medium of claim 7, further comprising instructions that, when executed by at least the processor, cause the processor to:
determine an amount of time that the first user communicates with each member of the group of the plurality of other users;
prepare a listing of each member of the group of the plurality of other users based upon the amount of time that the first user communicates with that member of the group of the plurality of other users; and
configure the first user's device to display the listing on the first user's device.

11. The non-transitory computer-readable medium of claim 7, further comprising instructions that, when executed by at least the processor, cause the processor to:
receive information related to each of the members of the group of the plurality of other users, wherein the information includes names, telephone numbers, and e-mail addresses of each of the members of the group of the plurality of other users;
process the received information related to each of the members of the group of the plurality of other users to create an address listing of each of the members of the group of the plurality of other users; and
configure the first user's device to display the address listing of each of the members of the group of the plurality of other users on the first user's device.

12. The non-transitory computer-readable medium of claim 7, further comprising instructions that, when executed by at least the processor, cause the processor to:
monitor communications between the first user and each member of the group of the plurality of other users;
determine if the first user and each member of the group of the plurality of other users are actively communicating;
determine if the first user and each member of the group of the plurality of other users are not actively communicating;
determine if the first user has communicated with a member of the group of the plurality of other users and the member of the group of the plurality of other users has not communicated back to the first user;
create an array of objects, wherein each of the array of objects is configured to show one of the following:
if the first user and each member of the group of the plurality of other users are actively communicating,
if the first user and each member of the group of the plurality of other users are not actively communicating, or
if the first user has communicated with a member of the group of the plurality of other users and the member of the group of the plurality of other users has not communicated back to the first user; and
configure the first user's device to display the array of objects on the first user's device.

13. A computing system configured as an application server, comprising:
at least one processor connected to at least one memory;
a non-transitory computer readable medium including instructions stored thereon that, when executed by the at least one processor, cause the at least one processor to:
receive a first audio signal that is based upon speech uttered by a first user and captured by one or more microphones located on a device associated with the first user;
process the first audio signal to create a voice biography of the first user;
receive a first video signal that is based upon an image of the first user and captured by a camera located on the first user's device;
process the first video signal to create a profile picture of the first user;
store the voice biography of the first user and the profile picture of the first user;
retrieve the voice biography of the first user and the profile picture of the first user;
display the voice biography of the first user and the profile picture of the first user on the first user's device;

receive other audio signals that are based upon speech uttered by a plurality of other users and captured by one or more microphones located on devices associated with each of the plurality of other users;

process the other audio signals to create a voice biography of each of the plurality of other users;

receive other video signals that are based upon images of the plurality of other users and captured by a camera located on the devices associated with each of the plurality of other users;

process the other video signals to create a profile picture of each of the plurality of other users;

store the voice biography of each of the plurality of other users and the profile picture of each of the plurality of other users;

retrieve the voice biography of at least one of the plurality of other users and the profile picture of the at least one of the plurality of other users;

display the voice biography of the at least one of the plurality of other users and the profile picture of the at least one of the plurality of other users on the first user's device;

configure the first user's device to play the voice biography of the least one of the plurality of other users upon the first user selecting the voice biography of the at least one of the plurality of other users;

upon determining, by the first user, that the first user wants to communicate with the at least one of the plurality of other users, synchronizing the first user with the at least one of the plurality of other users in order that the first user and the at least one of the plurality of other users can communicate with each other through the first user's device and the device associated with the at least one of the plurality of other users;

retrieve voice biographies of a group of the plurality of other users and profile pictures of the group of the plurality of other users;

display the voice biographies of the group of the plurality of other users and the profile pictures of the group of the plurality of other users on the first user's device;

configure the first user's device to play the voice biography of each member of the group of the plurality of other users upon the first user selecting the voice biography of each member of the group of the plurality of other users; and upon determining, by the first user, that the first user wants to communicate with each member of the group of the plurality of other users, synchronizing the first user with each member of the group of the plurality of other users in order that the first user and each member of the group of the plurality of other users can communicate with each other through the first user's device and the device associated with each member of the group of the plurality of other users.

14. The computing system of claim 13, further comprising instructions that, when executed by at least the processor, cause the processor to:

configure the first user's device to allow the user to modify the voice biography of the first user to add a tag or a hashtag to the voice biography of the first user.

15. The computing system of claim 13, further comprising instructions that, when executed by at least the processor, cause the processor to:

determine an amount of time that the first user communicates with each member of the group of the plurality of other users;

prepare a listing of each member of the group of the plurality of other users based upon the amount of time that the first user communicates with that member of the group of the plurality of other users; and configure the first user's device to display the listing on the first user's device.

16. The computing system of claim 13, further comprising instructions that, when executed by at least the processor, cause the processor to:

receive information related to each of the members of the group of the plurality of other users, wherein the information includes names, telephone numbers, and e-mail addresses of each of the members of the group of the plurality of other users;

process the received information related to each of the members of the group of the plurality of other users to create an address listing of each of the members of the group of the plurality of other users; and configure the first user's device to display the address listing of each of the members of the group of the plurality of other users on the first user's device.

17. The computing system of claim 13, further comprising instructions that, when executed by at least the processor, cause the processor to:

monitor communications between the first user and each member of the group of the plurality of other users;

determine if the first user and each member of the group of the plurality of other users are actively communicating;

determine if the first user and each member of the group of the plurality of other users are not actively communicating;

determine if the first user has communicated with a member of the group of the plurality of other users and the member of the group of the plurality of other users has not communicated back to the first user;

create an array of objects, wherein each of the array of objects is configured to show one of the following;
if the first user and each member of the group of the plurality of other users are actively communicating,
if the first user and each member of the group of the plurality of other users are not actively communicating, or
if the first user has communicated with a member of the group of the plurality of other users and the member of the group of the plurality of other users has not communicated back to the first user; and configure the first user's device to display the array of objects on the first user's device.

* * * * *